(12) United States Patent
Han et al.

(10) Patent No.: US 11,817,957 B2
(45) Date of Patent: Nov. 14, 2023

(54) DATA DELIVERY STATUS INDICATING METHOD AND APPARATUS

(71) Applicant: HUAWEI TECHNOLOGIES CO., LTD., Guangdong (CN)

(72) Inventors: Feng Han, Shanghai (CN); Liwei Qiu, Shenzhen (CN); Xudong Yang, Shanghai (CN); Yinghao Jin, Boulogne-Billancourt (FR); Wei Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/565,694

(22) Filed: Dec. 30, 2021

(65) Prior Publication Data

US 2022/0123868 A1    Apr. 21, 2022

Related U.S. Application Data

(63) Continuation of application No. PCT/CN2020/098132, filed on Jun. 24, 2020.

(30) Foreign Application Priority Data

Jul. 4, 2019  (CN) .......................... 201910599270.1

(51) Int. Cl.
*H04L 1/16* (2023.01)
*H04L 1/1607* (2023.01)

(52) U.S. Cl.
CPC .................................. *H04L 1/1642* (2013.01)

(58) Field of Classification Search
CPC ... H04L 1/1642; H04L 1/1614; H04L 1/1896; H04L 1/1607; H04L 1/1812
See application file for complete search history.

(56) References Cited

U.S. PATENT DOCUMENTS 9,954,789 B2* 4/2018 Basu Mallick ......... H04L 47/28
2017/0257189 A1* 9/2017 Jiang ..................... H04L 1/0079
(Continued)

FOREIGN PATENT DOCUMENTS

CN   102823196 A   12/2012
CN   107113242 A   8/2017
(Continued)

OTHER PUBLICATIONS

ZTE: "(TP for NR BL CR for TS38.401) Corrections on centralized retransmission", 3GPP Draft R3-185233, Aug. 28, 2018, XP051528549, total 2 pages.

(Continued)

*Primary Examiner* — Jamal Javaid
(74) *Attorney, Agent, or Firm* — Gregg L. Jansen

(57) ABSTRACT

This application provides a data delivery status indicating method and an apparatus, to effectively indicate a data delivery status, facilitate more accurate flow control, and save transmission resources. A communication method is provided. The method includes a first network node sends data to a terminal device. The first network node sends first indication information and second indication information to a second network node. The first indication information indicated information about a highest sequence number (SN) successfully delivered in sequence in the data. The second indication information indicates information about an SN that is delivered after the highest SN.

20 Claims, 6 Drawing Sheets

(56) References Cited

U.S. PATENT DOCUMENTS

2018/0115491 A1    4/2018  Jonsson et al.
2020/0275481 A1*   8/2020  Turtinen ................. H04L 1/188

FOREIGN PATENT DOCUMENTS

| CN | 108259362 A | 7/2018 |
| CN | 108617029 A | 10/2018 |
| CN | 109803315 A | 5/2019 |
| CN | 109803453 A | 5/2019 |
| WO | 2018237001 A1 | 12/2018 |
| WO | 2019064202 A1 | 4/2019 |
| WO | 2020034431 A1 | 2/2020 |

OTHER PUBLICATIONS

NEC: "(TP for NR BL CR for TS 38.425): Retransmission status in UP", 3GPP Draft; R3-184728, Aug. 10, 2018, XP051528075, total 8 pages.
3GPP TS 38.425 V15.2.0 (Jun. 2018), 3rd Generation Partnership Project; Technical Specification Group Radio Access Network; NG-RAN; NR user plane protocol(Release 15), 21 pages.
3GPP TS 38.425 V15.5.0 (Mar. 2019), 3rd Generation Partnership Project; Technical Specification Group Radio Access Network; NG-RAN; NR user plane protocol(Release 15), 22 pages.
3GPP TS 38.401 V15.5.0 (Mar. 2019), 3rd Generation Partnership Project; Technical Specification Group Radio Access Network; NG-RAN; Architecture description(Release 15), 39 pages.

* cited by examiner

DATA DELIVERY STATUS INDICATING METHOD AND APPARATUS

CROSS-REFERENCE TO RELATED APPLICATIONS

This application is a continuation of International Application No. PCT/CN2020/098132, filed on Jun. 24, 2020, which claims priority to Chinese Patent Application No. 201910599270.1, filed on Jul. 4, 2019. The disclosures of the aforementioned applications are hereby incorporated by reference in their entireties.

TECHNICAL FIELD

This application relates to the communication field, and more specifically, to a data delivery status indicating method and an apparatus.

BACKGROUND

With comprehensive development and gradual deepening of researches on a next-generation communication system, the industry has reached a basic consensus on specific content of researches on a 5th generation (5G) system. 5G supports various types of network deployments and application types, for example, supports an access capability characterized by higher-rate experience and higher bandwidth, information exchange characterized by a lower latency and higher reliability, and access and management of larger-scale and lower-cost machine type communication (MTC) devices.

As shown above, a larger quantity of devices are supported to access a network in 5G scenarios. Therefore, flow control is particularly important. Generally, after sending data to a terminal device, a first network node (for example, a distributed unit (DU)) feed back a delivery status of the data to a second network node (for example, a centralized unit (CU)). Based on the delivery status of the data, the second network node may determine data that needs to be retransmitted or may further control a data flow, to perform flow control.

Therefore, reporting the delivery status of the data by the first network node is particularly important for the second network node to perform accurate flow control.

SUMMARY

This application provides a data delivery status indicating method and an apparatus, to effectively indicate a data delivery status, facilitate more accurate flow control, and save transmission resources.

According to a first aspect, a communication method is provided, where the method may include: A first network node sends data to a terminal device; and the first network node sends first indication information and second indication information to a second network node. The first indication information is used to indicate information about a highest sequence number SN successfully delivered in sequence in the data, and the second indication information is used to indicate information about an SN that is delivered after the highest SN successfully delivered in sequence in the data.

Optionally, the information (Highest Transmitted NR PDCP SN Ind) about the highest sequence number SN successfully delivered in sequence in the data may include a packet data convergence protocol sequence number (packet data convergence protocol sequence number, PDCP SN), or may include a new radio user plane sequence number (new radio user plane sequence number, NR-U SN).

Based on the foregoing technical solution, the first network node indicates, to the second network node, the information about the sequence number (sequence number, SN) delivered after the highest SN successfully delivered in sequence. After receiving the information, the second network node may learn of the information about the SN that is delivered after the highest SN successfully delivered in sequence, to accurately determine an unsuccessfully delivered packet. In other words, the second network node can accurately determine a retransmitted packet. Therefore, when a link failure occurs on a link between the first network node and the terminal device, the second network node may accurately send to another network node data that needs to be retransmitted, thereby reducing delivery of redundant data and a resource waste. In addition, to support some services, for example, high-reliability low-latency services, the second network node usually sends downlink duplicate data to a plurality of network nodes (for example, two network nodes). Based on the information sent by the first network node about the SN that is delivered after the highest sequence number successfully delivered in sequence, the second network node can accurately determine data that has been successfully received by the terminal device and data that has not been successfully received by the terminal device. In this way, the second network node can accurately send to other network nodes only a packet that is not successfully received by the terminal device, thereby reducing delivery of redundant data while ensuring high-reliability low-latency service performance.

Therefore, when the second network node learns of the information about the SN that is delivered after the highest SN successfully delivered in sequence, the second network node can learn of a comprehensive data delivery status, and can execute a more accurate flow control mechanism, thereby reducing delivery of redundant data, effectively retransmitting data that fails to be delivered, and improving transmission efficiency.

Optionally, the data sent by the first network node to the terminal device may be initially delivered data, or may be retransmitted data. For example, for retransmitted data, initial delivery may be sending by the second network node to the terminal device via another network node, and retransmission may be sending via the first network node. For another example, for retransmitted data, initial delivery may be sending by the second network node to the terminal device via the first network node, and retransmission may be sending still via the first network node. Specific descriptions are provided in the following embodiments.

With reference to the first aspect, in some implementations of the first aspect, the information about the SN that is delivered after the highest SN successfully delivered in sequence in the data includes one or more of the following: information about the first successfully delivered SN after the highest SN successfully delivered in sequence in the data; information about the last successfully delivered SN after the highest SN successfully delivered in sequence in the data; information about all successfully delivered SNs after the highest SN successfully delivered in sequence in the data; information about all unsuccessfully delivered SNs after the highest SN successfully delivered in sequence in the data; a quantity of successfully delivered SNs after the highest SN successfully delivered in sequence in the data; a quantity of unsuccessfully delivered SNs after the highest SN successfully delivered in sequence in the data; or a quantity of ranges of successfully delivered SNs after the highest SN successfully delivered in sequence in the data.

Based on the foregoing technical solution, the information about the SN that is delivered after the highest SN successfully delivered in sequence in the data may include any one or more of the foregoing information. The second network node may learn of, based on any one or more of the foregoing information, information about a successfully delivered and/or an unsuccessfully delivered SN after the highest SN successfully delivered in sequence in the data, to more accurately determine the data that needs to be retransmitted.

Optionally, when the information about the SN that is delivered after the highest SN successfully delivered in sequence in the data includes a plurality of pieces of the foregoing information, the plurality of pieces of information may be information in one SN range. For example, when the information about the SN that is delivered after the highest SN successfully delivered in sequence in the data includes the information about the first successfully delivered SN and the last successfully delivered SN that are after the highest SN successfully delivered in sequence, information about the first successfully delivered SN and the last successfully delivered SN in a range of SNs that are delivered after the highest SN successfully delivered in sequence in the data may be indicated. Alternatively, the plurality of pieces of information may be information in different SN ranges. For example, when the information about the SN that is delivered after the highest SN successfully delivered in sequence in the data includes: information about the first successfully delivered SN after a highest SN successfully delivered in sequence in a first SN range, information about the last successfully delivered SN in the first SN range, information about the first successfully delivered SN after a highest SN successfully delivered in a second SN range, and information about the last successfully delivered SN in the second SN range. The rest may be deduced by analogy.

With reference to the first aspect, in some implementations of the first aspect, the second indication information indicates, by using a bitmap, information about a successfully delivered and/or an unsuccessfully delivered SN after the highest SN successfully delivered in sequence in the data.

Based on the foregoing technical solution, the first network node may indicate, by using the bitmap, the information about the successfully delivered and/or the unsuccessfully delivered SN after the highest SN successfully delivered in sequence in the data. This not only can quickly determine whether data is successfully or unsuccessfully delivered but also can reduce signaling overheads. For a specific indication manner, refer to descriptions in the following embodiments.

With reference to the first aspect, in some implementations of the first aspect, the second indication information further includes indication information used to indicate a quantity of bits of the bitmap.

Based on the foregoing technical solution, the first network node may also indicate, to the second network node, the quantity of bits included in the bitmap. The quantity of bits included in the bitmap indicates an amount of data indicated by the bitmap.

With reference to the first aspect, in some implementations of the first aspect, the method further includes: The first network node sends third indication information to the second network node, where the third indication information is used to indicate whether the successfully delivered SN is included after the highest SN successfully delivered in sequence in the data.

Optionally, the third indication information may indicate, by using an m1-bit field, whether a successfully delivered SN is included after the highest SN successfully delivered in sequence, where m1 is an integer greater than or equal to 1.

Optionally, the third indication information indicates whether a bitmap indication exists after the highest SN successfully delivered in sequence. For example, an m2-bit field is used to indicate whether the bitmap indication exists after the highest SN successfully delivered in sequence, where m2 is an integer greater than or equal to 1.

Optionally, the third indication information indicates whether an SN range indication exists after the highest SN successfully delivered in sequence. For example, an m3-bit field is used to indicate whether the SN range indication exists after the highest SN successfully delivered in sequence, where m3 is an integer greater than or equal to 1.

Optionally, the third indication information indicates whether the SN range indication or the bitmap indication is used after the highest SN successfully delivered in sequence. For example, an m4-bit field is used to indicate whether the SN range indication or the bitmap indication is used after the highest SN successfully delivered in sequence, where m4 is an integer greater than or equal to 1. For another example, whether the SN range indication or the bitmap indication is used after the highest SN successfully delivered in sequence is indicated through existence of the m2-bit field or the m3-bit field.

Based on the foregoing technical solution, the first network node may indicate, to the second network node, whether a successfully delivered SN is included after the highest SN successfully delivered in sequence in the data, so that the second network node can quickly determine whether a successfully delivered SN is included after the highest SN successfully delivered in sequence. Further, the second network node may also indicate a form of an SN that is delivered after the highest SN successfully delivered in sequence. Details are described in the following embodiments.

With reference to the first aspect, in some implementations of the first aspect, the first network node is a distributed unit, and the second network node is a centralized unit; or the first network node is a base station, and the second network node is a base station.

According to a second aspect, a communication method is provided, where the method may include: A second network node sends data to a first network node; and the second network node receives first indication information and second indication information that are sent by the first network node. The first indication information is used to indicate information about a highest sequence number SN successfully delivered in sequence in the data, and the second indication information is used to indicate information about an SN that is delivered after the highest SN successfully delivered in sequence in the data.

Based on the foregoing technical solution, the first network node indicates, to the second network node, the information about the sequence number (SN) delivered after the highest SN successfully delivered in sequence. After receiving the information, the second network node may learn of the information about the SN that is delivered after the highest SN successfully delivered in sequence, to accurately determine an unsuccessfully delivered packet. In other words, the second network node can accurately determine a retransmitted packet, thereby reducing delivery of redundant data and a resource waste.

Therefore, when the second network node learns of the information about the SN that is delivered after the highest SN successfully delivered in sequence, the second network node can learn of a comprehensive data delivery status, and can execute a more accurate flow control mechanism, thereby reducing delivery of redundant data, effectively retransmitting data that fails to be delivered, and improving transmission efficiency.

Optionally, the data sent by the first network node to the terminal device may be initially delivered data, or may be retransmitted data. Specific descriptions are provided in the following embodiments.

With reference to the second aspect, in some implementations of the second aspect, the information about the SN that is delivered after the highest SN successfully delivered in sequence in the data includes one or more of the following: information about the first successfully delivered SN after the highest SN successfully delivered in sequence in the data; information about the last successfully delivered SN after the highest SN successfully delivered in sequence in the data; information about all successfully delivered SNs after the highest SN successfully delivered in sequence in the data; information about all unsuccessfully delivered SNs after the highest SN successfully delivered in sequence in the data; a quantity of successfully delivered SNs after the highest SN successfully delivered in sequence in the data; a quantity of unsuccessfully delivered SNs after the highest SN successfully delivered in sequence in the data; or a quantity of ranges of successfully delivered SNs after the highest SN successfully delivered in sequence in the data.

Based on the foregoing technical solution, the information about the SN that is delivered after the highest SN successfully delivered in sequence in the data may include any one or more of the foregoing information. The second network node may learn of, based on any one or more of the foregoing information, information about a successfully delivered and/or an unsuccessfully delivered SN after the highest SN successfully delivered in sequence in the data, to more accurately determine the data that needs to be retransmitted.

Optionally, when the information about the SN that is delivered after the highest SN successfully delivered in sequence in the data includes a plurality of pieces of the foregoing information, the plurality of pieces of information may be information in one SN range. For example, when the data includes the information about the first successfully delivered SN and the last successfully delivered SN after the highest SN successfully delivered in sequence in the data, information about the first successfully delivered SN and the last successfully delivered SN in a range of SNs that are delivered after the highest SN successfully delivered in sequence in the data may be indicated.

Optionally, when the information about the SN that is delivered after the highest SN successfully delivered in sequence in the data includes a plurality of pieces of the foregoing information, the plurality of pieces of information may alternatively be information in different SN ranges. For example, the information about the SN that is delivered after the highest SN successfully delivered in sequence in the data may include information about the first successfully delivered SN after the highest SN successfully delivered in sequence in each SN range, and information about the last successfully delivered SN in the SN range. For example, the information about the SN that is delivered after the highest SN successfully delivered in sequence in the data may include: information about the first successfully delivered SN after a highest SN successfully delivered in sequence in a first SN range, information about the last successfully delivered SN in the first SN range, information about the first successfully delivered SN after a highest SN successfully delivered in a second SN range, and information about the last successfully delivered SN in the second SN range.

With reference to the second aspect, in some implementations of the second aspect, the second indication information indicates, by using a bitmap, information about a successfully delivered and/or an unsuccessfully delivered SN after the highest SN successfully delivered in sequence in the data.

Based on the foregoing technical solution, the first network node may indicate, by using the bitmap, the information about the successfully delivered and/or the unsuccessfully delivered SN after the highest SN successfully delivered in sequence in the data. This not only can quickly determine whether data is successfully or unsuccessfully delivered but also can reduce signaling overheads. For a specific indication manner, refer to descriptions in the following embodiments.

With reference to the second aspect, in some implementations of the second aspect, the second indication information further includes indication information used to indicate a quantity of bits of the bitmap.

Based on the foregoing technical solution, the first network node may also indicate, to the second network node, the quantity of bits included in the bitmap. The quantity of bits included in the bitmap indicates an amount of data indicated by the bitmap.

With reference to the second aspect, in some implementations of the second aspect, the method further includes: The first network node sends third indication information to the second network node, where the third indication information is used to indicate whether the successfully delivered SN is included after the highest SN successfully delivered in sequence in the data.

Optionally, the third indication information may indicate, by using an m1-bit field, whether a successfully delivered SN is included after the highest SN successfully delivered in sequence, where m1 is an integer greater than or equal to 1.

Optionally, the third indication information indicates whether a bitmap indication exists after the highest SN successfully delivered in sequence. For example, an m2-bit field is used to indicate whether the bitmap indication exists after the highest SN successfully delivered in sequence, where m2 is an integer greater than or equal to 1.

Optionally, the third indication information indicates whether an SN range indication exists after the highest SN successfully delivered in sequence. For example, an m3-bit field is used to indicate whether the SN range indication exists after the highest SN successfully delivered in sequence, where m3 is an integer greater than or equal to 1.

Optionally, the third indication information indicates whether the SN range indication or the bitmap indication is used after the highest SN successfully delivered in sequence. For example, an m4-bit field is used to indicate whether the SN range indication or the bitmap indication is used after the highest SN successfully delivered in sequence, where m4 is an integer greater than or equal to 1. For another example, whether the SN range indication or the bitmap indication is used after the highest SN successfully delivered in sequence is indicated through existence of the m2-bit field or the m3-bit field.

Based on the foregoing technical solution, the first network node may indicate, to the second network node, whether a successfully delivered SN is included after the highest SN successfully delivered in sequence in the data, so that the second network node can quickly determine whether a successfully delivered SN is included after the highest SN successfully delivered in sequence. Further, the second network node may also indicate a form of an SN that is delivered after the highest SN successfully delivered in sequence. Details are described in the following embodiments.

With reference to the second aspect, in some implementations of the second aspect, the first network node is a distributed unit, and the second network node is a centralized unit; or the first network node is a base station, and the second network node is a base station.

According to a third aspect, a communication apparatus is provided. The apparatus is a first network node, and has a function of implementing the method in the first aspect or the second aspect. The function may be implemented by hardware, or may be implemented by hardware executing corresponding software. The hardware or the software includes one or more units corresponding to the function.

According to a fourth aspect, a communication apparatus is provided. The apparatus is a second network node, and has a function of implementing the method in the first aspect or the second aspect. The function may be implemented by hardware, or may be implemented by hardware executing corresponding software. The hardware or the software includes one or more units corresponding to the function.

According to a fifth aspect, a communication apparatus is provided. The apparatus is a first network node, and the apparatus includes a memory, a communication interface, and a processor. The memory is configured to store a computer program or instructions, and the processor is coupled to the memory and the communication interface. The communication interface is configured to send data to a terminal device. The communication interface is further configured to send first indication information and second indication information to a second network node. The first indication information is used to indicate information about a highest sequence number SN successfully delivered in sequence in the data, and the second indication information is used to indicate information about an SN that is delivered after the highest SN successfully delivered in sequence in the data.

With reference to the fifth aspect, in some implementations of the fifth aspect, the processor is configured to generate the first indication information and the second indication information.

With reference to the fifth aspect, in some implementations of the fifth aspect, the information about the SN that is delivered after the highest SN successfully delivered in sequence in the data includes one or more of the following: information about the first successfully delivered SN after the highest SN successfully delivered in sequence in the data; information about the last successfully delivered SN after the highest SN successfully delivered in sequence in the data; information about all successfully delivered SNs after the highest SN successfully delivered in sequence in the data; information about all unsuccessfully delivered SNs after the highest SN successfully delivered in sequence in the data; a quantity of successfully delivered SNs after the highest SN successfully delivered in sequence in the data; a quantity of unsuccessfully delivered SNs after the highest SN successfully delivered in sequence in the data; or a quantity of ranges of successfully delivered SNs after the highest SN successfully delivered in sequence in the data.

With reference to the fifth aspect, in some implementations of the fifth aspect, the second indication information indicates, by using a bitmap, information about a successfully delivered and/or an unsuccessfully delivered SN after the highest SN successfully delivered in sequence in the data.

With reference to the fifth aspect, in some implementations of the fifth aspect, the second indication information further includes indication information used to indicate a quantity of bits of the bitmap.

With reference to the fifth aspect, in some implementations of the fifth aspect, the communication interface is further configured to send third indication information to the second network node, where the third indication information is used to indicate whether the successfully delivered SN is included after the highest SN successfully delivered in sequence in the data.

With reference to the fifth aspect, in some implementations of the fifth aspect, the apparatus is a distributed unit, and the second network node is a centralized unit; or the apparatus is a base station, and the second network node is a base station.

Optionally, in the fifth aspect or any implementation of the fifth aspect, the communication interface may be a receiver or a transmitter, or may be a transceiver.

According to a sixth aspect, a communication apparatus is provided. The apparatus is a second network node, and the apparatus includes a memory, a communication interface, and a processor. The memory is configured to store a computer program or instructions, and the processor is coupled to the memory and the communication interface. The communication interface is configured to send data to a first network node. The communication interface is further configured to receive first indication information and second indication information that are sent by the first network node. The first indication information is used to indicate information about a highest sequence number SN successfully delivered in sequence in the data, and the second indication information is used to indicate information about an SN that is delivered after the highest SN successfully delivered in sequence in the data.

With reference to the sixth aspect, in some implementations of the sixth aspect, the processor is configured to: determine the information about the SN that is delivered after the highest SN successfully delivered in sequence in the data, and determine the information about the SN that is delivered after the highest SN successfully delivered in sequence in the data.

With reference to the sixth aspect, in some implementations of the sixth aspect, the information about the SN that is delivered after the highest SN successfully delivered in sequence in the data includes one or more of the following: information about the first successfully delivered SN after the highest SN successfully delivered in sequence in the data; information about the last successfully delivered SN after the highest SN successfully delivered in sequence in the data; information about all successfully delivered SNs after the highest SN successfully delivered in sequence in the data; information about all unsuccessfully delivered SNs after the highest SN successfully delivered in sequence in the data; a quantity of successfully delivered SNs after the highest SN successfully delivered in sequence in the data; a quantity of unsuccessfully delivered SNs after the highest SN successfully delivered in sequence in the data; or a quantity of ranges of successfully delivered SNs after the highest SN successfully delivered in sequence in the data.

With reference to the sixth aspect, in some implementations of the sixth aspect, the second indication information indicates, by using a bitmap, information about a successfully delivered and/or an unsuccessfully delivered SN after the highest SN successfully delivered in sequence in the data.

With reference to the sixth aspect, in some implementations of the sixth aspect, the second indication information further includes indication information used to indicate a quantity of bits of the bitmap.

With reference to the sixth aspect, in some implementations of the sixth aspect, the communication interface is further configured to receive third indication information sent by the first network node, where the third indication information is used to indicate whether the successfully delivered SN is included after the highest SN successfully delivered in sequence in the data.

With reference to the sixth aspect, in some implementations of the sixth aspect, the first network node is a distributed unit, and the apparatus is a centralized unit; or the first network node is a base station, and the apparatus is a base station.

Optionally, in the sixth aspect or any implementation of the sixth aspect, the communication interface may be a receiver or a transmitter, or may be a transceiver.

According to a seventh aspect, a chip is provided. The chip includes a processing module and a communication interface, the processing module is configured to control the communication interface to perform external communication, and the processing module is further configured to implement the method provided in the first aspect or the second aspect.

According to an eighth aspect, a computer-readable storage medium is provided. The computer-readable storage medium stores a computer program; and when the computer program is executed by a communication apparatus, the communication apparatus is enabled to implement the method according to any one of the first aspect, the second aspect, or the implementations of the first aspect or the second aspect.

According to a ninth aspect, a computer program product including instructions is provided. When the instructions are executed by a computer, a communication apparatus is enabled to implement the method provided in the first aspect or the third aspect.

According to a tenth aspect, a communication system is provided, and includes the foregoing first network node and the foregoing second network node.

According to an eleventh aspect, a communication system is provided, and includes the foregoing first network node, the foregoing second network node, and the foregoing terminal device.

DESCRIPTION OF EMBODIMENTS

The following describes technical solutions in this application with reference to the accompanying drawings.

The technical solutions in the embodiments of this application may be used in various communication systems, for example, a long term evolution (LTE) system, an LTE frequency division duplex (FDD) system, an LTE time division duplex (TDD) system, a universal mobile telecommunication system (UMTS), a 5th generation (5G) system, a new radio (NR) system, or another evolved communication system.

In the embodiments of this application, a network device may be a device configured to communicate with a terminal device. The network device may be a base transceiver station (BTS) in a global system for mobile communication (GSM) or a code division multiple access (CDMA) system, may be a NodeB (NodeB, NB) in a wideband code division multiple access (WCDMA) system, may be an evolved NodeB (Evolutional NodeB, eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In a network structure, the network device may include a centralized unit (CU) node or a distributed unit (DU) node, may be a radio access network (RAN) device including a CU node and a DU node, or may be a RAN device including a control plane CU node (CU-CP node), a user plane CU node (CU-UP node), and a DU node.

Optionally, in the embodiments of this application, a first network node may be a DU, and a second network node may be a CU.

Figure 1:
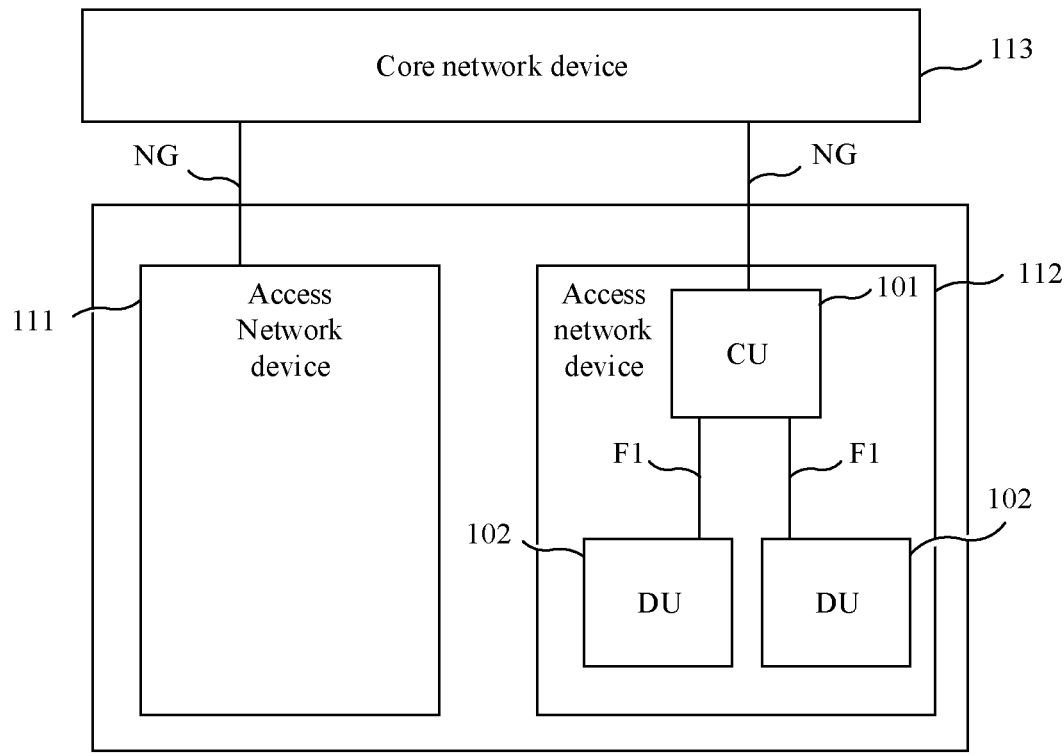
FIG. 1 and FIG. 2 are diagrams of an application scenario to which an embodiment of this application is applicable.

FIG. 1 is a diagram of an application scenario to which an embodiment of this application is applicable.

As shown in FIG. 1, a core network device 113, for example, a 5th generation core network (the 5th generation core network, 5GC), may be connected to a separate access network device 111, and may be connected to an access network device 112 including a CU 101 and a DU 102. The access network device may be, for example, a next generation node base station (next generation Node Base station, gNB).

The CU 101 and the DU 102 may be software-based or virtualized. Radio access network functions that need to be flexibly combined run in the CU 101, for example, functions at higher layers such as a service data adaptation protocol (SDAP) layer, a packet data convergence protocol (PDCP) layer, and a radio resource control (RRC) layer. RAN functions that are closely related to hardware and that have a relatively high requirement on real-time performance run in the DU 102, for example, functions at lower layers such as a radio link control (RLC) layer, a physical layer (PHY), and a media access control (MAC) layer.

The CU 101 and the DU 102 are connected to each other through a communication interface. The CU 101 and the core network device are also connected to each other through a communication interface. In this embodiment of this application, the communication interface between the CU 101 and the DU 102 may be referred to as an F1 interface. The interface between the CU 101 and the core network device may be referred to as an N2 interface or an NG interface. As shown in FIG. 1, one access network device 112 may include one CU 101 and one or more DUs 102. The CU 101 and the DU 102 are connected to each other through an F1 interface. One DU 102 can be connected to only one CU 101, and one CU 101 may be connected to one or more DUs 102.

For example, the access network device 102 is a gNB. The gNB may include one or more gNB-DUs and one gNB-CU. One gNB-DU is connected to one gNB-CU, and one gNB-CU may be connected to a plurality of gNB-DUs. The gNB-CU and the gNB-DUs connected to the gNB-CU are considered as one gNB by other gNBs and 5GCs.

Figure 2:
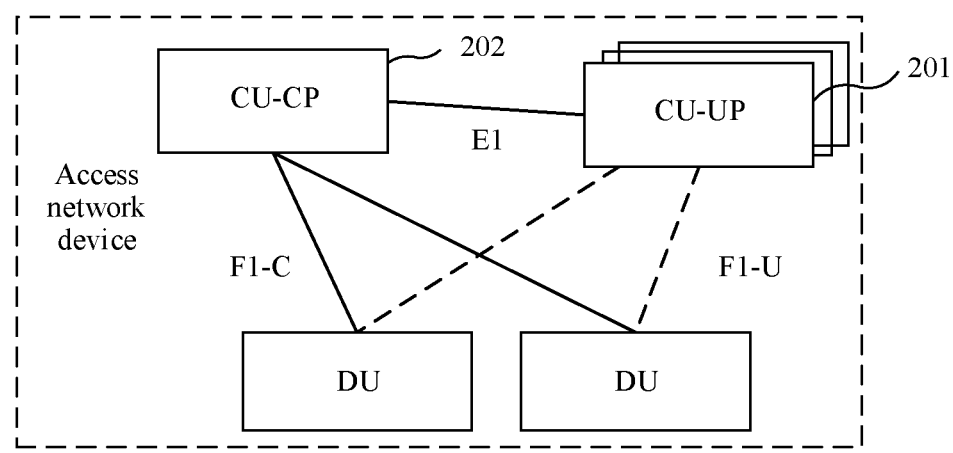

FIG. 2 is a diagram of another application scenario to which an embodiment of this application is applied.

As shown in FIG. 2, a CU includes a centralized unit-user plane (CU-UP) 201 and a centralized unit-control plane (CU-CP) 202. The CU-UP 201 and the CU-CP 202 may be on different physical devices. There may be an open interface between the CU-UP 201 and the CU-CP 202, and the interface may be referred to as an E1 interface. In addition, there may be an interface between a DU and each of the CU-UP 201 and the CU-CP 202. For example, an interface between the CU-CP 202 and the DU is an F1-C interface, and an interface between the CU-UP 201 and the DU is an F1-U interface.

The architecture in FIG. 2 may have the following features: One access network device may include one CU-CP 202, one or more CU-UPs 201, and a plurality of DUs. One DU may be connected to one CU-CP 202. One CU-UP 201 may be connected to only one CU-CP 202. One DU may be connected to a plurality of CU-UPs 201 under control of one CU-CP 202. One CU-UP 201 may be connected to a plurality of DUs under control of one CU-CP 202.

For example, the access network device is a gNB. One gNB-DU and one gNB-CU-UP are both connected to only one gNB-CU-CP. Under control of one gNB-CU-CP, one gNB-DU may be connected to a plurality of gNB-CU-UPs, and one gNB-CU-UP may be connected to a plurality of gNB-DUs.

Figure 3A:
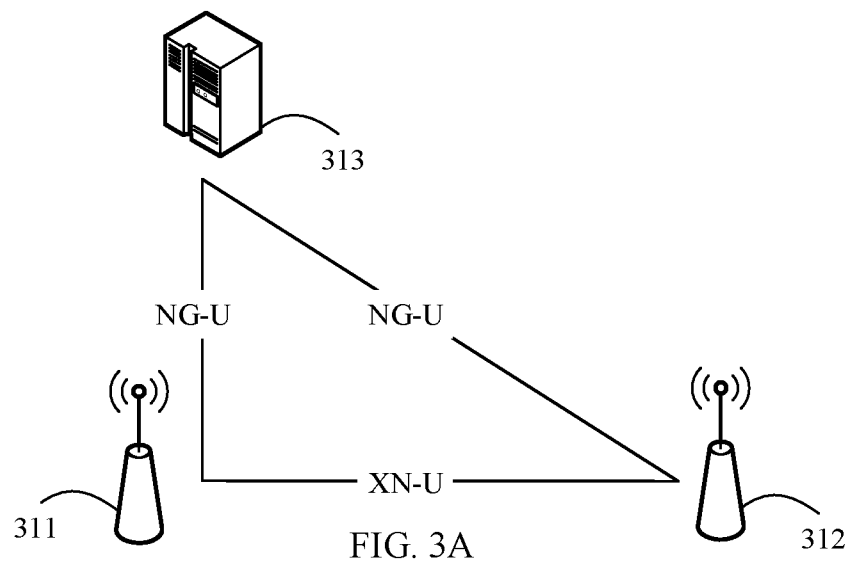
FIG. 3A and FIG. 3B are other diagrams of an application scenario to which an embodiment of this application is applicable.
Figure 3B:
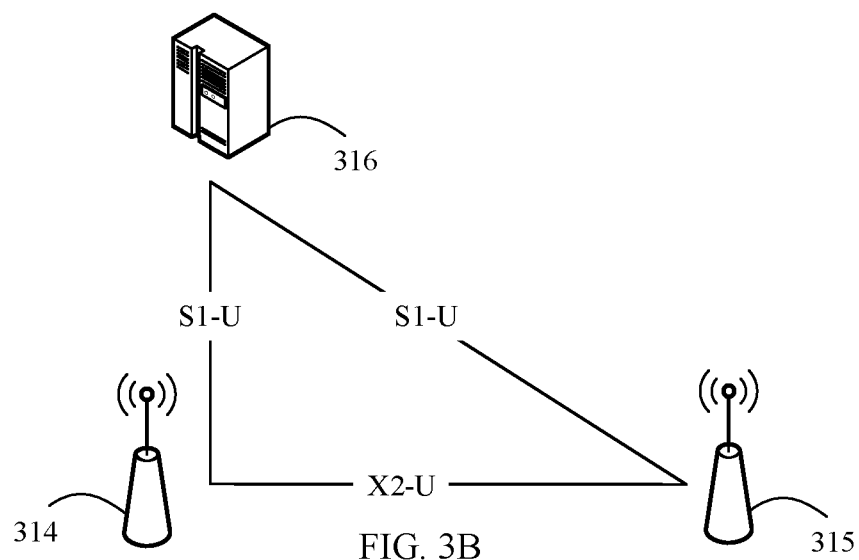

FIG. 3A and FIG. 3B are schematic diagrams of another application scenario to which an embodiment of this application is applied.

FIG. 3A is a schematic diagram of a 5G network to which an embodiment of this application is applied.

In FIG. 3A, the communication system 300 may include at least two access network devices, for example, an access network device 311 and an access network device 312. In addition, the communication system 300 may further include at least one core network device, for example, a core network device 313. The communication system 300 may further include at least one terminal device. The terminal device may establish radio links to the access network device 311 and the access network device 312 by using a dual connectivity (DC) technology or a multi-connectivity technology, or the terminal device may establish radio links to the access network device 311 and the access network device 312 by using a dual-connectivity technology or a multi-connectivity technology. The terminal device may establish a communication connection to the core network device 313 via the access network device 311 and the access network device 312. For example, the access network device 311 and the access network device 312 may provide a connection to a core network (CN) for the terminal device. The access network device 311 or the access network device 312 may be, for example, a radio network controller (RNC) or a base station. The radio network controller may be disposed in a base station, or may exist as a separate entity. The core network device 313 may include but is not limited to any one or more of the following: a user plane function (UPF) entity, an access and mobility management function (AMF) entity, a session management function (SMF) entity, or the like.

In addition, as shown in FIG. 3A, the access network device 311 may be, for example, a master base station, and the access network device 312 may be, for example, a secondary base station. In this case, the access network device 311 may be an access network device initially accessed by the terminal device, and is responsible for radio resource control (RRC) communication with the terminal device. The access network device 312 may be added during RRC reconfiguration, and is configured to provide additional radio resources. In other words, in the two access network devices, one access network device, for example, the access network device 311, may be responsible for exchanging a radio resource control message with the terminal device and for interacting with a core network control plane entity. In this case, the access network device 311 may be referred to as a master node (MN). For example, the master node may be an MeNB or an MgNB, and is not limited thereto. The other access network device, for example, the access network device 312, may be referred to as a secondary node (SN). For example, the secondary node may be an SeNB or an SgNB, and is not limited thereto. A plurality of serving cells of the master node may form a master cell group (MCG), including one primary cell (Pcell) and one or more optional serving cells (Scell). A plurality of serving cells of the secondary node may form a secondary cell group (SCG), including one primary secondary cell (PSCell) and one or more optional Scells. The serving cell is a cell configured by a network for the terminal device to perform uplink and downlink delivery.

In the network architecture shown in FIG. 3A, an NG-U interface is an interface between an access network device and a core network device (for example, a UPF entity), and an Xn-U interface is an interface between access network devices.

FIG. 3B is a schematic diagram of a 4G core network to which an embodiment of this application is applied.

In FIG. 3B, the communication system 300 may include at least two access network devices, for example, an access network device 314 and an access network device 315. In addition, the communication system 300 may further include at least one core network device, for example, a core network device 316. The communication system 300 may further include at least one terminal device. The terminal device may establish radio links to the access network device 314 and the access network device 315 by using a dual connectivity (DC) technology or a multi-connectivity technology, or the terminal device may establish radio links to the access network device 314 and the access network device 315 by using a dual-connectivity technology or a multi-connectivity technology. The terminal device may establish a communication connection to the core network device 316 via the access network device 314 and the access network device 315. For example, the access network device 314 and the access network device 315 may provide a connection to a core network for the terminal device. The access network device 314 or the access network device 315 may be, for example, a radio network controller, or a base station. The radio network controller may be disposed in a base station, or may exist as a separate entity. The core network device 316 may include but is not limited to any one or more of the following: a serving gateway (S-GW) entity, a mobility management entity (MME), a packet data network gateway (P-GW), or the like.

In addition, as shown in FIG. 3B, the access network device 314 may be, for example, a master base station, and the access network device 315 may be, for example, a secondary base station. In this case, the access network device 314 may be an access network device initially accessed by the terminal device, and is responsible for radio resource control (RRC) communication with the terminal device. The access network device 315 may be added during RRC reconfiguration, and is configured to provide additional radio resources. In other words, in the two access network devices, one access network device, for example, the access network device 314, may be responsible for exchanging a radio resource control message with the terminal device and for interacting with a core network control plane entity. In this case, the access network device 315 may be referred to as a master node. For example, the master node may be an MeNB or an MgNB, and is not limited thereto. The other access network device, for example, the access network device 316, may be referred to as a secondary node. For example, the secondary node may be an SeNB or an SgNB, and is not limited thereto. A plurality of serving cells of the master node may form a master cell group (MCG), including one primary cell (Pcell) and one or more optional serving cells (Scell). A plurality of serving cells of the secondary node may form a secondary cell group (SCG), including one primary secondary cell (PSCell) and one or more optional Scells. The serving cell is a cell configured by a network for the terminal device to perform uplink and downlink delivery.

In the network architecture shown in FIG. 3B, an S1-U interface is an interface between an access network device and a core network device (for example, an S-GW entity), and an X2-U interface is an interface between access network devices.

It should be understood that names of interfaces between the devices in FIG. 3A and FIG. 3B are merely examples, and the interfaces may have other names during implementation. This is not specifically limited in this application.

Similarly, the terminal device may alternatively have communication connections to a plurality of access network devices at the same time and may receive and send data. In the plurality of access network devices, one access network device may be responsible for exchanging a radio resource control message with the terminal device and for interacting with a core network control plane entity. In this case, the access network device may be referred to as an MN, and other access network devices may be referred to as SNs.

Optionally, in the embodiments of this application, the first network node may be an SN, and the second network node may be an MN. Alternatively, the first network node may be an MN, and the second network node may be an SN.

For example, for a radio bearer for which a PDCP layer is located in the MN (a radio bearer for which PDCP is located in the MN), for example, an MN terminated bearer (MN terminated bearer: in MR-DC, a radio bearer for which PDCP is located in the MN), the first network node may be an SN, and the second network node may be an MN.

For example, for a radio bearer for which a PDCP layer is located in the SN (a radio bearer for which PDCP is located in the SN), for example, an SN terminated bearer (SN terminated bearer: in MR-DC, a radio bearer for which PDCP is located in the SN), the first network node may be an MN, and the second network node may be an SN.

The terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, a user apparatus, or the like. Alternatively, the terminal device may be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

Generally, flow control may be performed between network nodes based on a data delivery status, for example, between a CU and a DU, or between an MN and an SN.

Figure 4:
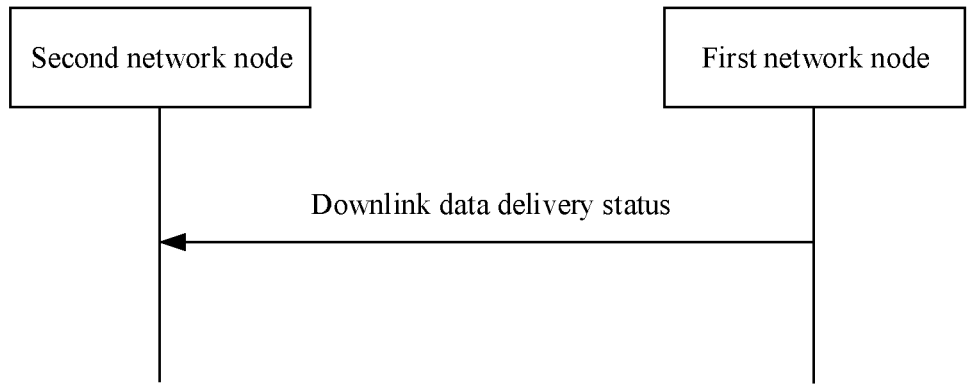
FIG. 4 is a diagram showing that a network node feeds back a data delivery status.

The following provides descriptions with reference to FIG. 4.

FIG. 4 is a diagram showing that a network node feeds back a data delivery status according to an embodiment. As shown in FIG. 4, a first network node (for example, a DU) sends a downlink data delivery status (DL data delivery status) to a second network node (a node with NR PDCP, such as CU), so that the second network node can control a data flow on each data radio bearer (DRB), and further may perform downlink flow control.

The embodiments of this application provide a solution, to effectively perform flow control, and reduce delivery of redundant data.

The following describes in detail the embodiments provided in this application with reference to the accompanying drawings.

Figure 5:
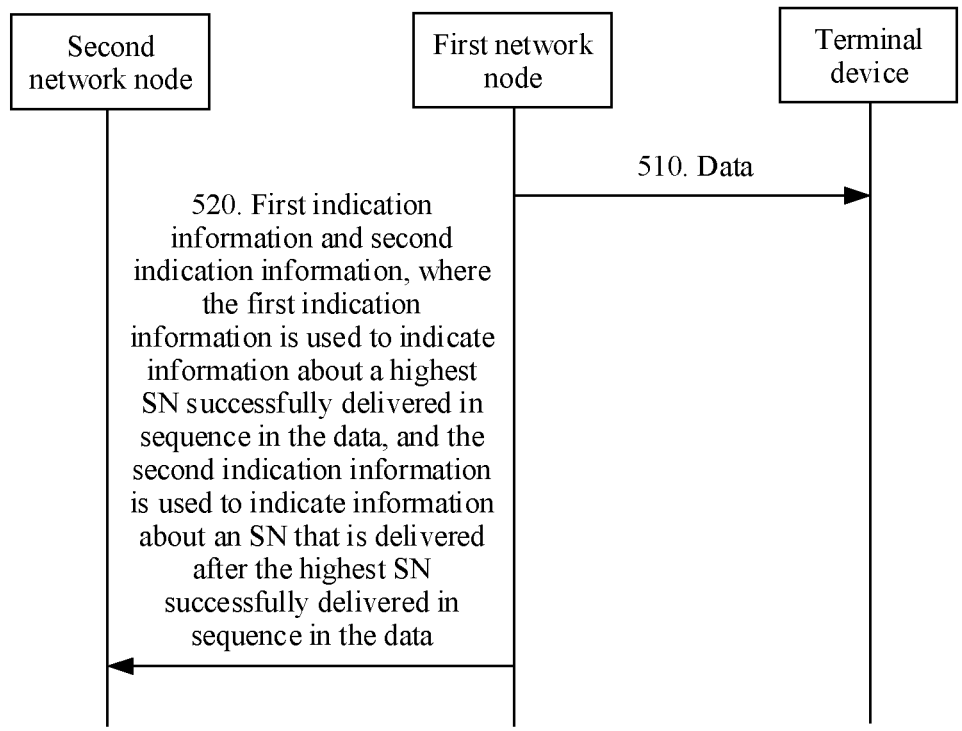
FIG. 5 is an interaction diagram of a method according to an embodiment of this application.

FIG. 5 is an interaction diagram of a method 500 according to an embodiment of this application. The method 500 may include the following steps.

510. A first network node sends data to a terminal device.

The first network node may send the data to the terminal device in any one of the following scenarios.

Scenario 1: Initial Delivery

The data is data newly delivered by the first network node to the terminal device. In other words, the first network node sends the data to the terminal device for the first time.

Scenario 2: Retransmission

The data is data retransmitted by the first network node to the terminal device. It may be understood as that previously delivery of the data fails, and the first network node retransmits the data to the terminal device. For example, previously, another network node unsuccessfully delivers the data to the terminal device. For another example, previously, the first network node unsuccessfully delivers the data to the terminal device.

The following describes the two scenarios in detail.

Optionally, before step 510, the method 500 may further include: A second network node sends the data to the first network node. After receiving the data, the first network node sends the data to the terminal device.

After sending the data to the terminal device, the first network node may feed back a data delivery status to the second network node.

520. The first network node sends first indication information and second indication information to the second network node. The first indication information is used to indicate information about a highest sequence number (SN) successfully delivered in sequence in the data, and the second indication information is used to indicate information about an SN that is delivered after the highest SN successfully delivered in sequence in the data.

The data delivery status generally includes two types: successful data delivery and unsuccessful data delivery.

The successful data delivery is used to indicate that the first network node sends the data to the terminal device, and the data is successfully received by the terminal device. For example, the first network node may determine, by receiving an acknowledgement (ACK) message fed back by the terminal device for the data, for example, an RLC acknowledgement message or a HARQ acknowledgement message, that the data is successfully delivered. The successfully delivered data may be initially delivered data, or may be retransmitted data. In the following content, successful data delivery is used.

It should be understood that, in this embodiment of this application, the successful data delivery may indicate that initial data delivery succeeds, or may indicate that data retransmission succeeds.

The unsuccessful data delivery is used to indicate that the first network node sends the data to the terminal device, but the data is unsuccessfully received by the terminal device. For example, the first network node may determine, by receiving a negative acknowledgement (NACK) message fed back by the terminal device for the data, for example, an RLC acknowledgement or a HARQ acknowledgement, that the data is unsuccessfully delivered. For another example, the first network node may determine, by not receiving a feedback message from the terminal device for the data, that the data is unsuccessfully delivered. The unsuccessful data delivery may be that the first network node fails to send the data, or may be that the terminal device fails to receive the data, for example, the terminal device does not correctly demodulate the data. A reason for the unsuccessful data delivery is not limited in this embodiment of this application. In the following content, unsuccessful data delivery is used.

It should be understood that, in this embodiment of this application, the unsuccessful data delivery may indicate that initial data delivery fails, or may indicate that data retransmission fails.

After sending the data to the terminal device, the first network node sends the first indication information and the second indication information to the second network node based on the data delivery status. It may also be understood as that the first network node sends the first indication information and the second indication information to the second network node, and the second network node may learn of the data delivery status based on the first indication information and the second indication information. The second network node learns of the data delivery status, the second network node may determine which data is successfully delivered and which data is unsuccessfully delivered, and further may determine information about the data that needs to be retransmitted, thereby optimizing a flow control mechanism and reducing delivery of redundant invalid data.

The first indication information and the second indication information may be carried in one piece of signaling, or may be carried in two pieces of signaling. This is not limited in this embodiment of this application.

The first indication information is used to indicate the information about the highest sequence number SN successfully delivered in sequence in the data. For example, the first network node indicates, to the second network node, a highest NR PDCP SN successfully delivered in sequence (highest successfully delivered NR PDCP Sequence Number).

The second indication information is used to indicate the information about the SN that is delivered after the highest SN successfully delivered in sequence in the data. The first network node indicates, to the second network node, the information about the SN that is after the highest SN successfully delivered in sequence, so that the second network node can determine information about a successfully delivered SN after the highest SN successfully delivered in sequence and information about an unsuccessfully delivered SN after the highest SN successfully delivered in sequence, to accurately obtain the data delivery status.

Optionally, the information about the SN that is delivered after the highest SN successfully delivered in sequence may include one or more of the following: information about the first successfully delivered SN after the highest SN successfully delivered in sequence; information about the last successfully delivered SN after the highest SN successfully delivered in sequence; information about all successfully delivered SNs after the highest SN successfully delivered in sequence; information about all unsuccessfully delivered SNs after the highest SN successfully delivered in sequence; a quantity of successfully delivered SNs after the highest SN successfully delivered in sequence; a quantity of unsuccessfully delivered SNs after the highest SN successfully delivered in sequence; or a range of successfully delivered SNs after the highest SN successfully delivered in sequence.

An example in which the first network node sends N packets to the terminal device is used. The following provides descriptions separately with reference to the foregoing two scenarios. N is an integer greater than or equal to 1.

For ease of description, in this embodiment of this application, a packet corresponding to the highest sequence number SN successfully delivered in sequence is recorded as a first packet, a packet corresponding to the first successfully delivered SN after the highest SN successfully delivered in sequence is recorded as a second packet, and a packet corresponding to the last successfully delivered SN after the highest SN successfully delivered in sequence is recorded as a third packet.

Scenario 1: Initial Delivery

Figure 6A:
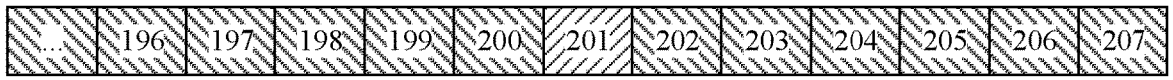
FIG. 6A and FIG. 6B are schematic diagrams of initial delivery scenarios to which an embodiment of this application is applicable.
Figure 6B:
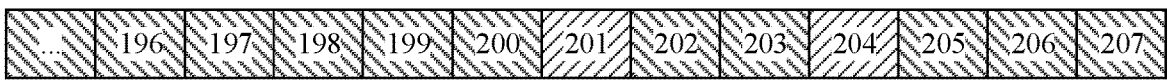

FIG. 6A and FIG. 6B are used as examples. It is assumed that the data sent by the first network node to the terminal device includes a packet 196, a packet 197, a packet 198, a packet 199, a packet 200, a packet 201, a packet 202, a packet 203, a packet 204, a packet 205, a packet 206, and a packet 207. In the example in FIG. 6A, the packet 201 is unsuccessfully delivered, and the other packets are successfully delivered. In the example in FIG. 6B, the packet 201 and the packet 204 are unsuccessfully delivered, and the other packets are successfully delivered.

That the first indication information is used to indicate the information (Highest Transmitted NR PDCP SN Ind) about the highest sequence number SN successfully delivered in sequence in the data may be understood as that the first indication information is used to indicate a highest PDCP SN successfully delivered in sequence. That is, the first indication information is used to indicate an SN of the first packet. For example, in FIG. 6A and FIG. 6B, the first indication information is used to indicate a PDCP SN, namely, 200, of the packet 200. In the examples shown in FIG. 6A and FIG. 6B, the first packet represents the packet 200.

The second indication information is used to indicate the information about the SN that is delivered after the highest SN successfully delivered in sequence in the data. For example, in the examples shown in FIG. 6A and FIG. 6B, the second indication information may be used to indicate information about a successfully delivered SN after the packet 200, and/or the second indication information may be used to indicate information about an unsuccessfully delivered SN after the packet 200.

It should be understood that FIG. 6A and FIG. 6B are merely examples for description, and this embodiment of this application is not limited thereto. For example, before the packet 196, more successfully delivered packets may be further included; or after the packet 200, more unsuccessfully delivered packets may be further included.

The following provides descriptions separately with reference to different information that may be included in the information about the SN that is delivered after the highest SN successfully delivered in sequence.

It should be understood that the SN mentioned in the following solutions may be a packet data convergence protocol sequence number (PDCP SN), a new radio user plane sequence number (NR-U SN), or another SN. This is not limited. For ease of understanding, in the scenario 1, an example in which the SN is the PDCP SN is mainly used for description.

Solution 1: The information about the SN that is delivered after the highest SN successfully delivered in sequence includes the information about the first successfully delivered SN after the highest SN successfully delivered in sequence.

In other words, the first network node indicates information about an SN of the second packet to the second network node.

Optionally, the second packet may be the first successfully delivered packet in all packets that are after the highest SN successfully delivered in sequence. FIG. 6A and FIG. 6B are used as examples. The first successfully delivered packet that is after the highest SN successfully delivered in sequence, that is, the second packet, is the packet 202. For example, the first network node may indicate a PDCP SN 202 of the packet 202 to the second network node. For another example, the first network node may indicate an NR-U SN 202 of the packet 202 to the second network node.

The first network node indicates, to the second network node, the information about the highest SN (that is, the information about the first packet) successfully delivered in sequence and information about the first successfully delivered SN (that is, the information about the second packet) after the highest SN successfully delivered in sequence. After receiving the information, the second network node may determine an unsuccessfully delivered packet, that is, the second network node may determine a retransmitted packet. For example, as shown in FIG. 6A and FIG. 6B, after receiving the information, the second network node may determine that the packet 201 is unsuccessfully delivered. That is, the packet 201 needs to be retransmitted.

Solution 2: The information about the SN that is delivered after the highest SN successfully delivered in sequence includes the information about the first successfully delivered SN after the highest SN successfully delivered in sequence and the quantity of ranges of successfully delivered SNs after the highest SN successfully delivered in sequence.

In other words, the first network node indicates, to the second network node, information about an SN of the second packet and the quantity of ranges of successfully delivered SNs after the highest SN successfully delivered in sequence.

In an implementation, the second indication information may indicate, by using a field, the quantity of ranges of successfully delivered SNs after the highest SN successfully delivered in sequence. For example, an x-bit field is used to indicate the quantity of ranges of successfully delivered SNs after the highest SN successfully delivered in sequence, where x is an integer greater than or equal to 1. For example, a fixed-bit (for example, 8-bit) field is used to indicate the quantity of ranges of successfully delivered SNs after the highest SN successfully delivered in sequence. For example, 00000001 indicates that the quantity of SN ranges is 1, and 00000010 indicates that the quantity of SN ranges is 2.

A range of successfully delivered SNs after the highest SN successfully delivered in sequence may indicate one or more unsuccessfully delivered packets and one or more successfully delivered packets. Alternatively, all packets in a range of successfully delivered SNs after the highest SN successfully delivered in sequence are successfully delivered.

For brevity, the range of successfully delivered SNs after the highest SN successfully delivered in sequence is referred to as an SN range for short below.

In the example in FIG. 6A, the packet 201 is unsuccessfully delivered. An SN range may represent the packet 201 to the packet 207, and the SN range includes one packet (the packet 201) that is unsuccessfully delivered. Alternatively, an SN range may represent the packet 202 to the packet 207, and all packets in the SN range are successfully delivered. Regardless of which manner used to represent the SN range, in the example of FIG. 6B, a quantity of SN ranges is 1.

In the example in FIG. 6B, the packet 201 and the packet 204 are unsuccessfully delivered. SN ranges may indicate the packet 201 to the packet 203 and the packet 204 to the packet 207, that is, there are two SN ranges, and each SN range includes one packet (the packet 201 or the packet 204) that is unsuccessfully delivered. Alternatively, SN ranges may indicate the packet 202 and the packet 203, and the packet 205 to the packet 207, that is, there are two SN ranges, and all packets in each SN range are successfully delivered. Regardless of which manner used to represent the SN range, in the example of FIG. 6B, a quantity of SN ranges is 2.

It should be understood that the foregoing descriptions are merely examples for understanding of the SN range, and this embodiment of this application is not limited thereto.

It should be further understood that, the SN range may include only a successfully delivered packet, or the SN range may include both a successfully delivered packet and an unsuccessfully delivered packet.

It should be further understood that, when the SN range includes both the successfully delivered packet and unsuccessfully delivered data, it may be assumed that first P packets in each SN range are unsuccessfully delivered packets, where P is an integer greater than or equal to 1, and P may be a preset value. For example, it may be assumed that the $1^{st}$ packet in each SN range is an unsuccessfully delivered packet.

It should be further understood that the quantity of SN ranges is an integer greater than or equal to 0.

For example, a case in FIG. 6A is used as an example. For example, the second indication information may indicate, by using a 1-bit field, that the quantity of SN ranges is 1. For another example, the second indication information may indicate, by using an 8-bit field whose value is 1, that the quantity of SN ranges is 1.

In another implementation, the second indication information may indicate the quantity of SN ranges by using a quantity of bitmaps.

The bitmap may be used to indicate the information about the SN that is delivered after the highest SN successfully delivered in sequence, and the quantity of bitmaps indicates the quantity of SN ranges. For example, in FIG. 6A, one bitmap may be used to indicate the information about the SN that is delivered after the highest SN successfully delivered in sequence. That is, in this implementation, the quantity of bitmaps is equal to the quantity of SN ranges. How to indicate the quantity of bitmaps is not limited in this embodiment of this application.

A solution to using a bitmap to indicate the information about the SN that is delivered after the highest SN successfully delivered in sequence is described below with reference to a solution 4.

In the solution 2, the first network node indicates, to the second network node, the information about the first packet, the information about the second packet, and the quantity of SN ranges. After receiving the information, the second network node may determine an unsuccessfully delivered packet, that is, the second network node may determine the retransmitted packet.

Optionally, the second packet may include the first successfully delivered packet in each SN range after the highest SN successfully delivered in sequence.

For example, in FIG. 6A, the second packet is the packet 202. As shown in FIG. 6A, after receiving the information, the second network node may determine that the packet 201 is unsuccessfully delivered, that is, the packet 201 needs to be retransmitted. In addition, the second network node may determine, based on that the second packet is the packet 202 and that the quantity of SN ranges is 1, that all packets following the second packet are successfully delivered.

For another example, in FIG. 6B, the second packet includes the packet 202 and the packet 205. As shown in FIG. 6B, after receiving the information, the second network node may determine that the packet 201 and the packet 204 are unsuccessfully delivered, that is, the packet 201 and the packet 204 need to be retransmitted. In addition, the second network node may determine, based on that the second packet includes the packet 202 and the packet 204 and that the quantity of SN ranges is 2, that all of the other packets are successfully delivered.

Solution 3: The information about the SN that is delivered after the highest SN successfully delivered in sequence includes the information about the first successfully delivered SN after the highest SN successfully delivered in sequence, the quantity of SN ranges, and the quantity of successfully delivered SNs after the highest SN successfully delivered in sequence.

In other words, the first network node indicates, to the second network node, information about an SN of the second packet, the quantity of SN ranges, and the quantity of successfully delivered SNs after the highest SN successfully delivered in sequence.

Optionally, the second packet may be the first successfully delivered packet in all packets that are after the highest SN successfully delivered in sequence. For example, in FIG. 6A, the second packet is the packet 202. For another example, in FIG. 6B, the second packet is the packet 202.

Optionally, the second packet may include the first successfully delivered packet in each SN range after the highest SN successfully delivered in sequence. For example, in FIG. 6A, the second packet is the packet 202. For another example, in FIG. 6B, the second packet includes the packet 202 and the packet 205.

Optionally, the quantity of successfully delivered SNs after the highest SN successfully delivered in sequence may be a quantity of sequentially successfully delivered SNs after the highest SN successfully delivered in sequence, that is, there may be one or more successfully delivered SNs in each SN range. For example, in FIG. 6A, the quantity of successfully delivered SNs after the highest SN successfully delivered in sequence is 6. For another example, in FIG. 6B, the quantity of successfully delivered SNs after the highest SN successfully delivered in sequence has two values: 2 and 3.

In the example in FIG. 6A, the information about the SN that is delivered after the highest SN successfully delivered in sequence may be shown in the following Table 1.

TABLE 1

| | |
|---|---|
| Quantity of SN ranges | 1 |
| PDCP SN of a second packet | 202 |
| Quantity of successfully delivered SNs after a highest SN successfully delivered in sequence | 6 |

As shown in Table 1, the first network node may indicate, to the second network node, that the quantity of SN ranges is 1. The first network node may further indicate, to the second network node, the first successfully delivered PDCP SN (Start of successfully transmitted PDCP Sequence Number range) after the highest SN successfully delivered in sequence, that is, 202. The first network node may further indicate, to the second network node, that the quantity (Number of successful transmitted PDCP Sequence Number ranges reported) of successfully delivered packets in packets in a range is 6.

In the example in FIG. 6B, the information about the SN that is delivered after the highest SN successfully delivered in sequence may be shown in the following Table 2. As described above, in the example of FIG. 6B, two SN ranges are included, and are denoted as a first SN range and a second SN range for differentiation. In FIG. 6B, the second packet includes the packet 202 and the packet 205, which, for differentiation, are denoted as a second packet in the first SN range and a second packet in the second SN range.

TABLE 2

| | |
|---|---|
| Quantity of SN ranges | 2 |
| PDCP SN of a second packet in the first SN range | 202 |
| Quantity of successfully delivered SNs in the first SN range after the highest SN successfully delivered in sequence | 2 |
| PDCP SN of a second packet in the second SN range | 205 |
| Quantity of successfully delivered SNs in the second SN range after the highest SN successfully delivered in sequence | 3 |

It should be understood that, in the solution 3, the information about the SN that is delivered after the highest SN successfully delivered in sequence may further include the information about the SN of the second packet and the quantity of successfully delivered SNs after the highest SN successfully delivered in sequence. The second network node may also determine the data delivery status based on the information about the SN of the second packet and the quantity of successfully delivered SNs after the highest SN successfully delivered in sequence.

In the solution 3, the first network node indicates, to the second network node, the information about the first packet, the PDCP SN of the second packet, the quantity of SN ranges, and the quantity of successfully delivered SNs after the highest SN successfully delivered in sequence. After receiving the information, the second network node may determine an unsuccessfully delivered packet.

For example, as shown in FIG. 6A, the quantity of SN ranges is 1. After receiving the indication information, the second network node may determine that the packet 201 is unsuccessfully delivered, that is, the packet 201 needs to be retransmitted, and all of the other packets are successfully delivered.

For another example, as shown in FIG. 6B, the quantity of SN ranges is 2. It is assumed that the second packet includes the first successfully delivered packet in each SN range after the highest SN successfully delivered in sequence. In this case, for the first SN range, a quantity of successfully delivered packets is 2 (namely, the packet 202 and the packet 203); for the second SN range, a quantity of successfully delivered packets is 3 (namely, the packet 205, the packet 206, and the packet 207). After receiving the indication information, the second network node may determine that the packet 201 and the packet 204 are unsuccessfully delivered, that is, the packet 201 and the packet 204 need to be retransmitted, and all of the other packets are successfully delivered.

Solution 4: The information about the SN that is delivered after the highest SN successfully delivered in sequence includes the information about all the successfully delivered SNs after the highest SN successfully delivered in sequence.

The solution 4 may be implemented at least in any one of the following implementations.

Implementation 1: A y-bit bitmap is used to indicate whether a packet is successfully delivered, where y is an integer greater than or equal to 1. Each bit may indicate one packet, or each bit may indicate a delivery success or delivery failure of one packet. For example, 1 indicates that delivery succeeds, and 0 indicates that delivery fails.

The information about the SN that is delivered after the highest SN successfully delivered in sequence may be shown in the following Table 3.

As shown in Table 3, the first network node may indicate, to the second network node, a quantity of bits included in the bitmap, where the quantity of bits included in the bitmap is the same as a quantity of packets indicated by the bitmap. It may also be understood that the first network node may indicate the quantity of packets to the second network node.

TABLE 3

| Quantity of bits included in a bitmap |
|---|
| bitmap |
| bitmap |

For example, the y-bit bitmap may use the 1$^{st}$ packet in the N packets as a reference.

As shown in FIG. 6A and FIG. 6B, the y-bit bitmap may use the packet 196 as a reference.

Figure 7:
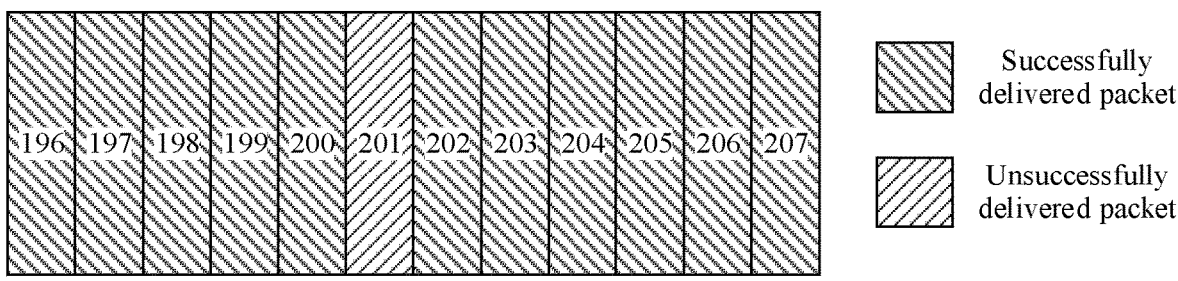
FIG. 7 and FIG. 8 are diagrams of a bitmap to which an embodiment of this application is applicable.

The following provides descriptions with reference to FIG. 6A and FIG. 7.

It can be learned from FIG. 6A that successfully delivered packets include the packet 196, the packet 197, the packet 198, the packet 199, the packet 200, the packet 202, the packet 203, the packet 204, the packet 205, the packet 206, and the packet 207, and unsuccessfully delivered packets include the packet 201. In this case, the packet 196 may be used as a reference, and indication starts from the packet 196. In other words, a 12-bit bitmap may be used to indicate the delivered packets. As shown in FIG. 7, the 12-bit indication is a binary number (111110111111), and each bit may indicate one packet, where 1 indicates that delivery succeeds, and 0 indicates that delivery succeeds. In this case, it indicates that the packet 201 corresponding to "0" is unsuccessfully delivered.

Optionally, the first network node may indicate the quantity, for example, 12, of bits included in the bitmap to the second network node. In other words, the bitmap is used to indicate a delivery status of the 12 packets.

For example, the y-bit bitmap may use the first packet as a reference.

As shown in FIG. 6A and FIG. 6B, the y-bit bitmap may use the packet 200 as a reference.

The following provides descriptions with reference to FIG. 6A and FIG. 7.

Figure 8:
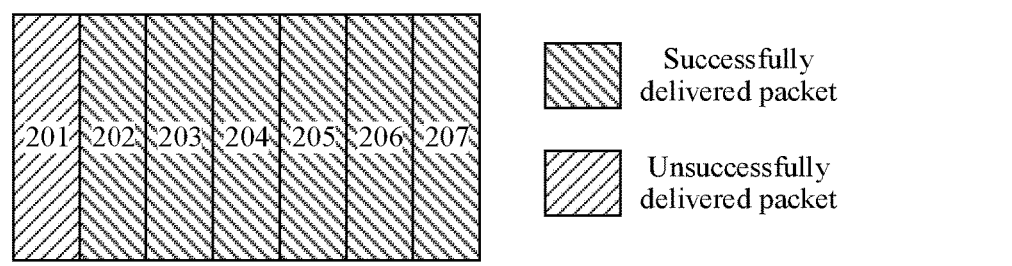

It can be learned from FIG. 6A that successfully delivered packets include the packet 196, the packet 197, the packet 198, the packet 199, the packet 200, the packet 202, the packet 203, the packet 204, the packet 205, the packet 206, and the packet 207, and unsuccessfully delivered packets include the packet 201. In this case, the packet 200 may be used as a reference, and indication starts from a packet following the packet 200. In other words, a 7-bit bitmap may be used to indicate the delivered packets. As shown in FIG. 8, the 7-bit indication is a binary number (0111111), and each bit may indicate one packet, where 1 indicates that delivery succeeds, and 0 indicates that delivery succeeds. In this case, it indicates that the packet 201 corresponding to "0" is unsuccessfully delivered.

Optionally, the first network node may indicate the quantity, for example, 7, of bits included in the bitmap to the second network node. In other words, the bitmap is used to indicate a delivery status of the seven packets.

For example, a field may be used to indicate a quantity of bits occupied by the bitmap (that is, the quantity of bits included in the bitmap). As shown in Table 3, assuming that the bitmap occupies 15 bits of two bytes, the quantity of bits occupied by the bitmap is 15.

For another example, a field may be used to indicate a quantity of bytes occupied by the bitmap, and the quantity of bits included in the bitmap is determined based on a value of the field.

For another example, a fixed-bit (for example, 8-bit) field may be used to indicate the quantity of bits included in the bitmap. For example, 00001000 indicates that the bitmap is 8 bits, that is, the quantity of bits included in the bitmap is 8. For another example, 00010001 indicates that the bitmap is 9 bits, that is, the quantity of bits included in the bitmap is 9.

The foregoing implementation 1 is merely an example for description. It should be understood that this embodiment of this application is not limited thereto. Any manner in which a bitmap may be used to indicate whether a packet is successfully delivered falls within the protection scope of the embodiments of this application.

For example, when the y-bit bitmap uses the packet 200 as a reference, indication may alternatively start from the packet 200, that is, an 8-bit bitmap may be used to indicate delivered packets. For example, the 8-bit bitmap is a binary number (10111111), indicating that the packet following the packet 200, that is, the packet 201, is unsuccessfully delivered, and that the remaining packets are successfully delivered.

For another example, when the y-bit bitmap uses the packet 202 as a reference, indication may alternatively start from the packet 202, that is, a 6-bit bitmap may be used to indicate delivered packets. For example, the 6-bit bitmap is a binary number (111111), indicating that the packet 202 and the subsequent packets are successfully delivered. In addition, the second network node may also determine that remaining packets are unsuccessfully delivered.

Implementation 2: The information about the SN that is delivered after the highest SN successfully delivered in sequence includes each successfully delivered SN after the highest SN successfully delivered in sequence.

That a PDCP SN of a packet is indicated is used as an example. The information about the SN that is delivered after the highest SN successfully delivered in sequence may be shown in the following Table 4.

TABLE 4

Number of successful transmitted PDCP Sequence Number reported
Successfully transmitted PDCP Sequence Number 1
Successfully transmitted PDCP Sequence Number 2
. . .

As shown in Table 4, the first network node may indicate, to the second network node, a PDCP SN (Successfully transmitted PDCP Sequence Number) of a successfully delivered packet after the highest SN successfully delivered in sequence, such as the successfully transmitted PDCP sequence number 1 and the successfully transmitted PDCP sequence number 2 in Table 4. In the example in FIG. 6A, the first network node may indicate, to the second network node, that successfully delivered packets in the N2 packets include the packet 202, the packet 203, the packet 204, the packet 205, the packet 206, and the packet 207.

Optionally, as shown in Table 4, the second network node may further indicate, to the first network node, a quantity (Number of successful transmitted PDCP Sequence Number reported) of successfully delivered packets after the highest SN successfully delivered in sequence.

In the solution 4, the first network node indicates, to the second network node, information about the first packet and the information about the successfully delivered packets after the highest SN successfully delivered in sequence. After receiving the information, the second network node may determine an unsuccessfully delivered packet. For example, as shown in FIG. 6A and FIG. 6B, after receiving the indication information, the second network node may determine that the packet 201 is unsuccessfully delivered, that is, the packet 201 needs to be retransmitted, and all of the other packets are successfully delivered.

Solution 5: The information about the SN that is delivered after the highest SN successfully delivered in sequence includes information about the second packet and information about the third packet.

In other words, the first network node indicates the information about the second packet and the information about the third packet to the second network node.

Optionally, the second packet may be the first successfully delivered packet in all packets that are after the highest SN successfully delivered in sequence. Alternatively, the second packet may include the first successfully delivered packet in each SN range after the highest SN successfully delivered in sequence.

Optionally, the third packet may be the last successfully delivered packet in all packets after the highest SN successfully delivered in sequence. For example, in FIG. 6A, the third packet is the packet 207. For another example, in FIG. 6B, the third packet is the packet 207.

Optionally, the third packet may include the last successfully delivered packet in each SN range after the highest SN successfully delivered in sequence. In other words, the third packet may include a packet that is after the highest SN successfully delivered in sequence and that is successfully delivered with a highest SN after the second packet. For example, in FIG. 6A, the third packet is the packet 207. For another example, in FIG. 6B, the third packet includes the packet 203 and the packet 207.

The solution 5 is mainly described by using an example in which the second packet and the third packet are packets in one SN range. In other words, the second packet includes the first successfully delivered packet in each SN range after the highest SN successfully delivered in sequence. The third packet includes the last successfully delivered packet in each SN range after the highest SN successfully delivered in sequence.

That a PDCP SN of a packet is indicated is used as an example. The information about the SN that is delivered after the highest SN successfully delivered in sequence may be shown in the following Table 5.

TABLE 5

Number of successful transmitted PDCP Sequence Number ranges reported
Start of Successfully transmitted PDCP Sequence Number range
End of Successfully transmitted PDCP Sequence Number range
. . .

As shown in Table 5, the first network node may indicate a PDCP SN of the second packet to the second network node. The first network node may indicate, to the second network node, a PDCP SN (Start of successfully transmitted PDCP Sequence Number range) of the first successfully delivered packet in an SN range after the highest SN successfully delivered in sequence. The first network node may further indicate a PDCP SN of the third packet to the second network node. The first network node may indicate, to the second network node, a PDCP SN (End of successfully transmitted PDCP Sequence Number range) of the last successfully delivered packet after the highest SN successfully delivered in sequence.

Optionally, in the solution 5, the information about the SN that is delivered after the highest SN successfully delivered in sequence may further include the quantity of SN ranges, the quantity (Number of successful transmitted PDCP Sequence Number ranges reported) of SN ranges after the highest SN successfully delivered in sequence. In other words, the information about the SN that is delivered after the highest SN successfully delivered in sequence may include the information about the second packet, the information about the third packet, and the quantity of SN ranges.

In the example in FIG. 6A, the information about the SN that is delivered after the highest SN successfully delivered in sequence may be shown in the following Table 6.

TABLE 6

| Quantity of SN ranges | 1 |
| --- | --- |
| PDCP SN of a second packet | 202 |
| PDCP SN of a third packet | 207 |

In the example in FIG. 6B, the information about the SN that is delivered after the highest SN successfully delivered in sequence may be shown in the following Table 7. As described above, in the example in FIG. 6B, the third packet includes the packet 203 and the packet 207. For differentiation, the packet 203 and the packet 207 are respectively denoted as a third packet in a first SN range and a third packet in a second SN range.

TABLE 7

| | |
|---|---|
| Quantity of SN ranges | 2 |
| PDCP SN of a second packet in the first range | 202 |
| PDCP SN of a third packet in the first range | 203 |
| PDCP SN of a second packet in the second range | 205 |
| PDCP SN of a third packet in the second range | 207 |

Optionally, as shown in Table 5 to Table 7, the first network node may further indicate, to the second network node, the quantity (Number of successful transmitted PDCP Sequence Number ranges reported) of ranges of successfully delivered SNs after the highest SN successfully delivered in sequence. Alternatively, the first network node may further report, to the second network node, a quantity of successfully delivered packets in all packets.

In the solution 5, the first network node indicates, to the second network node, the PDCP SN of the first packet, the PDCP SN of the second packet, and the PDCP SN of the third packet. After receiving the information, the second network node may determine an unsuccessfully delivered packet.

Solution 6: The information about the SN that is delivered after the highest SN successfully delivered in sequence includes the information about the unsuccessfully delivered packet after the highest SN successfully delivered in sequence.

The solution 6 may be implemented at least in any one of the following implementations.

In a implementation, a y-bit bitmap is used to indicate whether a packet is successfully delivered, where y is an integer greater than or equal to 1. Each bit may indicate one packet, or each bit may indicate a delivery success or delivery failure of one packet. For example, 1 indicates that delivery succeeds, and 0 indicates that delivery fails.

For this implementation, refer to the implementation 1 in the solution 4. Details are not described herein again.

In another implementation, a PDCP SN of the unsuccessfully delivered packet after the highest SN successfully delivered in sequence is indicated.

That a PDCP SN of a packet is indicated is used as an example. The information about the SN that is delivered after the highest SN successfully delivered in sequence may be shown in the following Table 8.

TABLE 8

| |
|---|
| Number of failed transmitted PDCP Sequence Number reported |
| Failed transmitted PDCP Sequence Number 1 |
| Failed transmitted PDCP Sequence Number 2 |
| . . . |

As shown in Table 8, the first network node may indicate, to the second network node, a PDCP SN (Failed transmitted PDCP Sequence Number) of the unsuccessfully delivered packet after the highest SN successfully delivered in sequence.

Optionally, as shown in Table 8, the second network node may further indicate, to the first network node, a quantity (Number of failed transmitted PDCP Sequence Number reported) of unsuccessfully delivered packets after the highest SN successfully delivered in sequence, such as the failed transmitted PDCP sequence number 1 and the failed transmitted PDCP sequence number 2 in Table 8. Alternatively, the first network node may further report, to the second network node, a quantity (Number of failed transmitted PDCP Sequence Number reported) of unsuccessfully delivered packets in the N packets.

In the solution 6, the first network node indicates, to the second network node, information about the first packet and the information about the unsuccessfully delivered packet after the highest SN successfully delivered in sequence. After receiving the information, the second network node may determine the unsuccessfully delivered packet.

For example, as shown in FIG. 6A, the first packet is the packet 200, and the unsuccessfully delivered packet after the highest SN successfully delivered in sequence is the packet 201. After receiving the indication information, the second network node may determine that the packet 201 is unsuccessfully delivered, that is, the packet 201 needs to be retransmitted, and all of the other packets are successfully delivered.

For another example, as shown in FIG. 6B, the first packet is the packet 200, and the unsuccessfully delivered packet after the highest SN successfully delivered in sequence includes the packet 201 and the packet 204. After receiving the indication information, the second network node may determine that the packet 201 and the packet 204 are unsuccessfully delivered, that is, the packet 201 and the packet 204 need to be retransmitted, and all of the other packets are successfully delivered.

Solution 7: The information about the SN that is delivered after the highest SN successfully delivered in sequence includes the information about the last successfully delivered SN after the highest SN successfully delivered in sequence.

In other words, the first network node indicates information about an SN of the third packet to the second network node.

Optionally, the third packet may be the last successfully delivered packet in all packets after the highest SN successfully delivered in sequence. Alternatively, the third packet may include the last successfully delivered packet in each SN range after the highest SN successfully delivered in sequence.

For example, in FIG. 6A, the third packet is the packet 207, and the first network node may indicate a PDCP SN (namely, 207) of the third packet to the second network node. The first network node may further indicate a PDCP SN (namely, 200) of the first packet to the second network node. The second network node may determine, based on the information about the first packet and the information about the third packet, that the packet 201 is unsuccessfully delivered. For remaining packets that are after the highest SN successfully delivered in sequence, in an implementation, the second network node may determine, according to an agreement or a preset rule, that all packets between the first packet and the third packet are unsuccessfully delivered. In another implementation, the second network node may determine, according to an agreement or a preset rule, that all packets following the second packet are successfully delivered.

For another example, in FIG. 6B, the third packet includes the packet 203 and the packet 207, and the first network node may indicate PDCP SNs (namely, 203 and 207) of the third packet to the second network node. The first network node may further indicate a PDCP SN (namely, 200) of the first packet to the second network node. The second network node may determine, based on the information about the first packet and the information about the third packet, that the packet 201 and the packet 204 are unsuccessfully delivered. For remaining packets that are after the highest SN successfully delivered in sequence, in an implementation, the second network node may determine, according to an agreement or a preset rule, that all packets between the first packet and the third packet are unsuccessfully delivered. In another implementation, the second network node may determine, according to an agreement or a preset rule, that all packets following the second packet are successfully delivered.

It should be understood that the foregoing plurality of solutions are merely examples for description, and this embodiment of this application is not limited thereto. For example, the information about the SN that is delivered after the highest SN successfully delivered in sequence may include information about the second packet and a quantity of unsuccessfully delivered packets after the highest SN successfully delivered in sequence. For another example, the information about the SN that is delivered after the highest SN successfully delivered in sequence may include the information about the third packet and a quantity of unsuccessfully delivered packets after the highest SN successfully delivered in sequence.

It should be further understood that, for example, the foregoing plurality of solutions may be used separately or may be used in combination. For example, the solution 1 and the solution 7 are used in combination. That is, the second indication information is used to indicate the information about the second packet and the information about the third packet. In this case, based on the information about the second packet and the information about the third packet, the second network node determines a packet that is unsuccessfully delivered, or determines a packet that needs to be retransmitted.

It should be further understood that, in the foregoing solutions, the second packet may be the first successfully delivered packet in all packets after the highest SN successfully delivered in sequence. Alternatively, the second packet may include the first successfully delivered packet in each SN range after the highest SN successfully delivered in sequence.

It should be further understood that, in the foregoing solutions, the third packet may be the last successfully delivered packet in all packets after the highest SN successfully delivered in sequence. Alternatively, the third packet may include the last successfully delivered packet in each SN range after the highest SN successfully delivered in sequence.

It should be further understood that the foregoing solutions may be applied to each SN range, that is, information about an SN in each SN range is determined. Alternatively, the foregoing solutions may be applied to a plurality of SN ranges, that is, information about an SN in the plurality of SN ranges is determined. This is not limited herein.

It should be further understood that, in the scenario 1, the information about the SN in the foregoing plurality of solutions may be replaced with "PDCP SN".

It should be further understood that all the foregoing solutions may be applied to the scenario 2.

In the foregoing solutions, the first network node indicates, to the second network node, the information about the SN that is delivered after the highest SN successfully delivered in sequence. After receiving the information, the second network node may accurately determine a packet that is unsuccessfully delivered, that is, the second network node may accurately determine a retransmitted packet, thereby reducing delivery of redundant data.

Therefore, when a link failure occurs on a link between the first network node and the terminal device, the second network node may accurately send to another network node data that needs to be retransmitted, thereby reducing delivery of redundant data and a resource waste. In addition, to support some services, for example, high-reliability low-latency services, the second network node usually sends downlink duplicate data to a plurality of network nodes (for example, two network nodes). Based on the information sent by the first network node about the SN that is delivered after the highest sequence number successfully delivered in sequence, the second network node can accurately determine data that has been successfully received by the terminal device and data that has not been successfully received by the terminal device. In this way, the second network node can accurately send to other network nodes only a packet that is not successfully received by the terminal device, thereby reducing delivery of redundant data while ensuring high-reliability low-latency service performance.

Conversely, if the first network node indicates only the information about the first packet to the second network node, after receiving the information, the second network node determines that all packets following the first packet are unsuccessfully delivered, and retransmits all the packets following the first packet. For example, as shown in FIG. 6A and FIG. 6B, after receiving the indication information, the second network node may determine that all packets after the packet 200 are unsuccessfully delivered, that is, the second network node determines that the packet 201, the packet 202, the packet 203, the packet 204, the packet 205, the packet 206, and the packet 207 need to be retransmitted. Unnecessary packet retransmission is caused, which wastes resources.

The foregoing describes a plurality of solutions with reference to the scenario 1, and the following describes solutions with reference to the scenario 2.

Scenario 2: Retransmission

Figure 9:
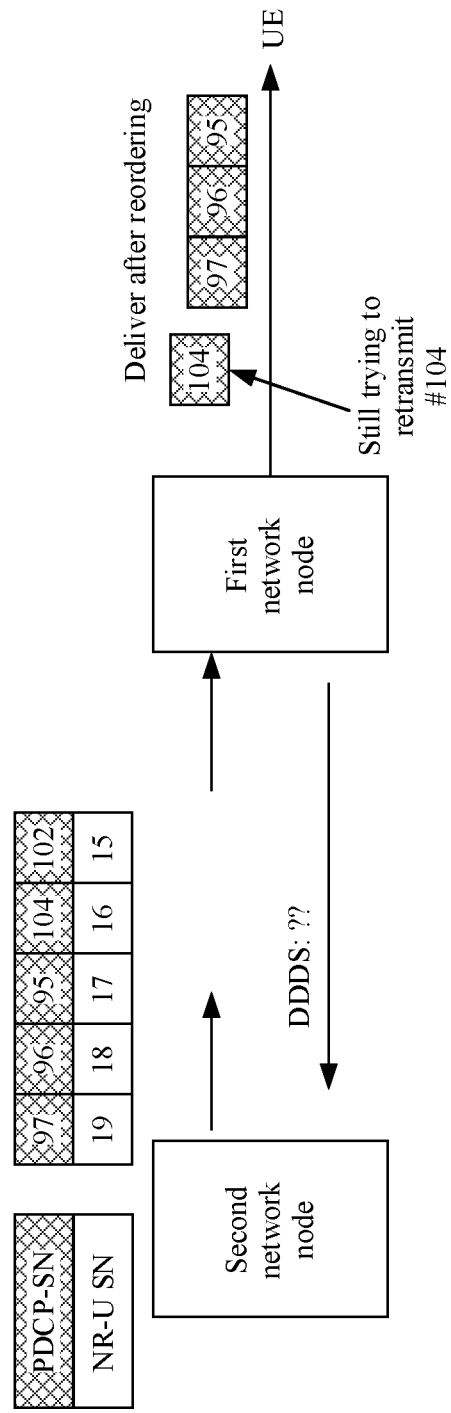
FIG. 9 is a diagram of a retransmission scenario to which another embodiment of this application is applicable.

FIG. 9 is used as an example. FIG. 9 is a diagram of a retransmission scenario to which an embodiment of this application is applicable. It is assumed that a packet 102 and a packet 104 are packets that fail to be retransmitted on another network node different from the first network node. This may be understood as that when the another network node sends data to the terminal device, the packet 102 and the packet 104 are unsuccessfully delivered, and the another network node reports the delivery failure of the packet 102 and the packet 104 to the second network node. A packet 95, a packet 96, a packet 97 are packets that fail to be retransmitted on the first network node. This may be understood as that when the first network node sends data to the terminal device, the packet 95, the packet 96, and the packet 97 are unsuccessfully delivered, and the first network node reports the delivery failure of the packet 95, the packet 96, and the packet 97 to the second network node. Alternatively, when the second network node sends data to the first network node, a packet 95, a packet 96, and a packet 97 are unsuccessfully delivered or are lost, and the first network node reports the delivery failure or loss of the packet 95, the packet 96, and the packet 97 to the second network node. Therefore, the second network node retransmits the packet 95, the packet 96, and the packet 97 to the first network node.

In a retransmission process, the packet 102, the packet 104, the packet 95, the packet 96, and the packet 97 are all retransmitted on the second network node. In other words, the first network node retransmits, to the terminal device, the packets that are unsuccessfully delivered.

NR-Us associated with the packet 102, the packet 104, the packet 95, the packet 96, and the packet 97 are 15, 16, 17, 18, and 19 respectively. A sequence of packets sent by the second network node to the first network node is 102, 104, 95, 96, and 97, and the associated NR-Us are 15, 16, 17, 18, and 19 respectively. The first network node retransmits the packets to the terminal device. In a retransmission process, a sequence of the packet retransmitted by the first network node to the terminal device is: the packet 95, the packet 96, the packet 97, the packet 102, and the packet 104. Optionally, when retransmitting the packets to the terminal device, the first network node may not adjust the sequence of the packets.

As shown in FIG. 9, it is assumed that in the retransmission process, delivery of the packet 104 fails, and delivery of the remaining packets succeeds.

The first indication information is used to indicate the information about the highest SN successfully delivered in sequence in the data, that is, the first indication information is used to indicate the information about the SN of the first packet. For example, FIG. 9 is used as an example. The first indication information may be used to indicate a PDCP SN of the packet 102, that is, 102, or the first indication information may be used to indicate an NR-U SN of the packet 102, that is, 15. In the example shown in FIG. 9, the first packet represents the packet 102. In an example, the information about the highest SN successfully delivered in sequence in the data may be information about a highest NR-U SN successfully delivered in sequence in the data.

The second indication information is used to indicate the information about the SN that is delivered after the highest SN successfully delivered in sequence in the data. For example, the second indication information may be used to indicate information about an SN that is delivered after the packet 102. In the example shown in FIG. 9, the second packet represents the packet 95, and SN information of the second packet may be, for example, a PDCP SN of the second packet, that is, 95, or may be an NR-U of the second packet, that is, 17. That is, the information about the second packet indicated by the first network node to the second network node is information about the packet 95. For example, 95 or 17 is indicated. The third packet is the packet 97, and SN information of the third packet may be, for example, a PDCP SN of the third packet, that is, 97, or may be an NR-U of the third packet, that is, 19. That is, the information about the third packet indicated by the first network node to the second network node is information about the packet 97. For example, 97 or 19 is indicated.

It should be understood that FIG. 9 is merely an example for description, and this embodiment of this application is not limited thereto.

All of the solutions 1 to 7 mentioned in the foregoing scenario 1 may be used in the scenario 2. Details are not described herein again for brevity.

In the scenario 2, the SN information may indicate a PDCP SN, or may indicate an NR-U SN. With reference to the foregoing plurality of solutions, the following briefly describes a case in which the SN information is an NR-U SN.

In the scenario 2, a successfully delivered packet is a successfully retransmitted packet, that is, a successfully retransmitted packet in the retransmission process. A packet that is unsuccessfully delivered is a packet that is unsuccessfully retransmitted, that is, a packet that fails to be retransmitted in the retransmission process.

Solution 1: The information about the SN that is delivered after the highest SN successfully delivered in sequence includes the information about the first successfully delivered SN after the highest SN successfully delivered in sequence.

In other words, the first network node may indicate the NR-U SN of the second packet to the second network node.

FIG. 9 is used as an example. The first successfully delivered packet that is after the highest SN successfully delivered in sequence, that is, the second packet, is the packet 95. In other words, the first network node may indicate the NR-U SN (that is, 17) of the packet 95 to the second network node.

The first network node indicates, to the second network node, the information about the highest SN (that is, information about the first packet) successfully delivered in sequence and information about the first successfully delivered SN (that is, the NR-U SN of the second packet) after the highest SN successfully delivered in sequence. After receiving the information, the second network node may determine an unsuccessfully delivered packet, that is, the second network node may determine a retransmitted packet. For example, as shown in FIG. 9, after receiving the information, the second network node may determine that the packet 104 is unsuccessfully delivered, that is, the packet 104 needs to be retransmitted. In addition, the second network node may consider by default that all other packets except the packet 104 are successfully delivered.

Solution 2: The information about the SN that is delivered after the highest SN successfully delivered in sequence includes the information about the first successfully delivered SN after the highest SN successfully delivered in sequence and the quantity of ranges of successfully delivered SNs after the highest SN successfully delivered in sequence.

In other words, the first network node indicates, to the second network node, the NR-U SN of the second packet and the quantity of ranges of successfully delivered SNs after the highest SN successfully delivered in sequence.

For the SN range, refer to the descriptions in the scenario 1. Details are not described herein again.

In the solution 2, the first network node indicates, to the second network node, the information about the first packet, the NR-U SN of the second packet, and the SN range. After receiving the information, the second network node may determine an unsuccessfully delivered packet, that is, the second network node may determine a retransmitted packet.

For example, as shown in FIG. 9, after receiving the information, the second network node may determine that the packet 104 is unsuccessfully delivered, that is, the packet 104 needs to be retransmitted. In addition, if the second network node determines that the second packet is the packet 95, and that the quantity of SN ranges is 1, the second network node may successfully deliver packets (that is, the packet 96 and the packet 97) following the second packet.

Solution 3: The information about the SN that is delivered after the highest SN successfully delivered in sequence includes the information about the first successfully delivered SN after the highest SN successfully delivered in sequence, the quantity of SN ranges, and the quantity of successfully delivered SNs after the highest SN successfully delivered in sequence.

In other words, the first network node indicates, to the second network node, the NR-U SN of the second packet, the quantity of SN ranges, and the quantity of successfully delivered SNs after the highest SN successfully delivered in sequence.

In the example in FIG. 9, the information about the SN that is delivered after the highest SN successfully delivered in sequence may be shown in the following Table 9.

TABLE 9

| | |
|---|---|
| Number of successful transmitted NR-U Sequence Number ranges reported | 1 |
| Start of successfully transmitted NR-U Sequence Number range | 17 |
| Number of successful transmitted NR-U Sequence Number ranges reported | 3 |

As shown in Table 9, the first network node may indicate, to the second network node, that the quantity of SN ranges, that is, a quantity (Number of successful transmitted NR-U Sequence Number ranges reported) of SN ranges after the highest SN successfully delivered in sequence, is 1. The first network node may indicate the NR-U SN of the second packet to the second network node. That is, the first network node may indicate, to the second network node, that an NR-U SN (Start of successfully transmitted NR-U Sequence Number range) of the first successfully delivered packet in an SN range after the highest SN successfully delivered in sequence is 17. The first network node may further indicate, to the second network node, that the quantity (Number of successful transmitted NR-U Sequence Number ranges reported) of successfully delivered packets in the SN range is 3.

In the solution 3, the first network node indicates, to the second network node, the information about the first packet, the NR-U SN of the second packet, the quantity of SN ranges, and the quantity of successfully delivered SNs after the highest SN successfully delivered in sequence. After receiving the information, the second network node may determine an unsuccessfully delivered packet. For example, as shown in FIG. 9, after receiving the indication information, the second network node may determine that the packet 104 is unsuccessfully delivered, that is, the packet 104 needs to be retransmitted, and all of the other packets are successfully delivered.

Solution 4: The information about the SN that is delivered after the highest SN successfully delivered in sequence includes the information about all the successfully delivered SNs after the highest SN successfully delivered in sequence.

For the solution 4, refer to the descriptions in the solution 4 in the foregoing scenario 1, and only the PDCP SN needs to be replaced with the NR-U SN.

Solution 5: The information about the SN that is delivered after the highest SN successfully delivered in sequence includes information about the second packet and information about the third packet.

For the solution 5, refer to the descriptions in the solution 5 in the foregoing scenario 1, and only the PDCP SN needs to be replaced with the NR-U SN.

Solution 6: The information about the SN that is delivered after the highest SN successfully delivered in sequence includes the information about the unsuccessfully delivered packet after the highest SN successfully delivered in sequence.

For the solution 6, refer to the descriptions in the solution 6 in the foregoing scenario 1. In another implementation, only the PDCP SN needs to be replaced with the NR-U SN.

Solution 7: The information about the SN that is delivered after the highest SN successfully delivered in sequence includes information about the third packet.

FIG. 9 is used as an example. The third packet is the packet 97, and the second network node may indicate the NR-U SN (19) of the second packet to the first network node. For the solution 7, refer to the descriptions in the solution 7 in the foregoing scenario 1, and only the PDCP SN needs to be replaced with the NR-U SN.

Optionally, the information about the SN that is delivered after the highest SN successfully delivered in sequence may further include a quantity of successfully delivered packets after the highest SN successfully delivered in sequence. In other words, the first network node may further indicate, to the second network node, the quantity (that is, 3) of successfully delivered packets after the highest SN successfully delivered in sequence.

In the example in FIG. 9, the information about the SN that is delivered after the highest SN successfully delivered in sequence may be shown in the following Table 10.

TABLE 10

| | |
|---|---|
| Number of successful transmitted NR-U Sequence Number ranges reported | 1 |
| End of successfully transmitted NR-U Sequence Number range | 19 |
| Number of successful transmitted NR-U Sequence Number ranges reported | 3 |

As shown in Table 10, the first network node may indicate, to the second network node, that the quantity of SN ranges, that is, a quantity (Number of successful transmitted NR-U Sequence Number ranges reported) of SN ranges after the highest SN successfully delivered in sequence, is 1. The first network node may indicate the NR-U SN of the third packet to the second network node. That is, the first network node may indicate, to the second network node, that an NR-U SN (End of successfully transmitted NR-U Sequence Number range) of the last successfully delivered packet in an SN range after the highest SN successfully delivered in sequence is 19. The first network node may indicate, to the second network node, that the NR-U SN of the third packet is 19. The first network node may further indicate, to the second network node, that the quantity (Number of successful transmitted NR-U Sequence Number ranges reported) of successfully delivered packets in the SN range is 3.

It should be understood that the foregoing describes the solution 1 to the solution 7 in the scenario 2 by using examples. For content not described in detail, refer to the descriptions in the scenario 1. Details are not described herein again.

It should be further understood that the solution 1 to the solution 7 may be applied to the scenario 1, and may also be applied to the scenario 2. This is not limited in this embodiment of this application. The plurality of solutions may be further applied to other scenarios, for example, a scenario in which repeated delivery is performed for a plurality of times.

It should be further understood that, when the solution 1 to the solution 7 mentioned in the foregoing scenario 1 are applied to the scenario 2, the successfully delivered SN may be replaced with a successfully retransmitted SN, and the unsuccessfully delivered SN may be replaced with an unsuccessfully retransmitted SN. A specific description manner thereof does not limit the protection scope of this embodiment of this application.

It should be further understood that, in the scenario 2, the SN information may indicate a PDCP SN, or may indicate an NR-U SN. In other words, in the scenario 2, the SN information may be replaced with a "PDCP SN", or the SN information may be replaced with an "NR-U SN".

In the foregoing solutions, the first network node indicates, to the second network node, the information about the SN that is delivered after the highest SN successfully delivered in sequence. After receiving the information, the second network node may accurately determine a packet that is unsuccessfully delivered, that is, the second network node may accurately determine a retransmitted packet.

Conversely, if the first network node indicates only the information about the first packet to the second network node, after receiving the information, the second network node determines that all packets following the first packet are unsuccessfully delivered, and retransmits all the packets following the first packet. For example, as shown in FIG. 9, after receiving the indication information, the second network node may determine that all packets after the packet 102 are unsuccessfully delivered, that is, the second network node determines that the packet 104, the packet 95, the packet 96, and the packet 97 need to be retransmitted. Unnecessary packet retransmission is caused, which wastes resources.

It should be understood that, in this embodiment of this application, the SN information may be a PDCP SN, may be an NR-U SN, or may be other information. Any form of SN information falls within the protection scope of this embodiment of this application.

It should be further understood that, in the foregoing scenario 1 or scenario 2, when the first network node sends the first indication information and the second indication information to the second network node, both the first indication information and the second indication information have a plurality of forms. This is not limited in this embodiment of this application. For example, the scenario 1 is used as an example, and the first indication information and the second indication information may be represented in forms shown in Table 11 and Table 12.

TABLE 11

| | | bits | | | | Quantity of octets (Number of Octets) |
|---|---|---|---|---|---|---|
| 7 6 5 | 4 | 3 | 2 | 1 | 0 | |
| PDU Type (=1) | | Highest delivered NR PDCP SN indication (Highest Transmitted NR PDCP SN Ind) (for an unacknowledged mode (for unacknowledged mode, for UM)) | Highest delivered NR PDCP SN indication (Highest Delivered NR PDCP SN Ind) (for an acknowledged mode (for acknowledged mode, for AM)) | Final frame indication (Final Frame Ind) | Lost packet (Lost Packet Report) | 1 |
| Spare (spare) | Second indication information | Data rate indication (Data rate Ind) | Retransmitted NR PDCP SN indication (Retransmitted NR PDCP SN Ind) | Delivered retransmitted NR PDCP SN indication (Delivered Retransmitted NR PDCP SN Ind) | Cause (Cause Report) | 1 |
| Reserved part | | | | | | ... |
| Number of successful delivered PDCP SN range | | | | | | 0 or 1 |
| Start of successfully delivered PDCP SN range | | | | | | 0 or 4 |
| End of successfully delivered PDCP SN range | | | | | | 0 or 4 |
| Padding | | | | | | 0 to 3 |

TABLE 12

| | | bits | | | | Number of Octets |
|---|---|---|---|---|---|---|
| 7 6 5 4 | | 3 | 2 | 1 | 0 | |
| PDU Type (=1) | | Highest Transmitted NR PDCP SN Ind (for UM) | Highest Delivered NR PDCP SN Ind (for AM) | Final Frame Ind | Lost Packet Report | 1 |
| spare | Second indication information | Data rate Ind | Retransmitted NR PDCP SN Ind | Delivered Retransmitted NR PDCP SN Ind | Cause Report | 1 |
| Reserved part Reserved part | | | | | | ... |
| Number of successful delivered PDCP SN range | | | | | | 0 or 1 |
| Start of successfully delivered PDCP SN range | | | | | | 0 or 4 |

TABLE 12-continued

| bits | Number of Octets |
|---|---|
| Quantity of packets in an SN range (range size) | 0 or 4 |
| Padding | 0 to 3 |

Table 11 and Table 12 may be improvements and adjustments based on existing protocols.

The number of successful delivered PDCP SN range (the quantity of successful delivered SN ranges) indicates the quantity of SN ranges after the highest SN successfully delivered in sequence. The start of successfully delivered PDCP SN range (first successfully delivered PDCP SN in the SN range) indicates the first successfully delivered PDCP SN after the highest SN successfully delivered in sequence, It should be further understood that the scenario 1 and the scenario 2 may alternatively coexist. For example, the indication information may be indicated in a form shown in Table 13. For differentiation, the second indication information in the scenario 1 (that is, a new delivery scenario) is recorded as newly delivered indication information, and the second indication information in the scenario 2 (that is, a retransmission scenario) is recorded as retransmitted indication information.

TABLE 13

| bits | | | | | | | | Number of Octets |
|---|---|---|---|---|---|---|---|---|
| 7 | 6 | 5 | 4 | 3 | 2 | 1 | 0 | |
| PDU Type (=1) | | | | | | | | 1 |
| Retransmitted indication information | | | Newly delivered indication information | | | | | 1 |
| Reserved part | | | | | | | | ... |
| Number of successful delivered PDCP SN range | | | | | | | | 0 or 1 |
| Start of successfully delivered PDCP SN range | | | | | | | | 0 or 4 |
| End of successfully delivered PDCP SN range | | | | | | | | 0 or 4 |
| Number of successful retransmitted delivered PDCP SN range | | | | | | | | 0 or 1 |
| Start of successfully retransmitted delivered PDCP SN range | | | | | | | | 0 or 4 |
| End of successfully retransmitted delivered PDCP SN range | | | | | | | | 0 or 4 | for example, may be the first successfully delivered PDCP SN in each SN range. The end of successfully delivered PDCP SN range (last successfully delivered PDCP SN in the SN range) indicates the last successfully delivered PDCP SN after the highest SN successfully delivered in sequence, for example, may be the last successfully delivered PDCP SN in each SN range.

The "reserved part" in Table 11 and Table 12 indicates that other information is reserved. The other information may include: a desired buffer size (Desired buffer size for the data radio bearer) for a data radio bearer, a desired data rate (Desired Data Rate), and the like. This is not limited.

The range size may indicate the quantity of successfully delivered packets in the SN range, or may indicate the quantity of packets that are unsuccessfully delivered in the SN range.

It should be understood that Table 11 and Table 12 are merely examples for description, and this embodiment of this application is not limited thereto. All variations related to Table 11 or Table 12 fall within the protection scope of this embodiment of this application. For example, the information about the SN that is delivered after the highest SN successfully delivered in sequence in the solutions in the foregoing scenario 1 and scenario 2 may be added to Table 11 or Table 12 or may replace the start of successfully delivered PDCP SN range. For details, refer to the descriptions in the scenario 1 and the scenario 2. Details are not described herein again.

It should be further understood that, with reference to Table 11 and Table 12, the scenario 1 is used as an example for description above. It should be understood that the scenario 2 (namely, a retransmission scenario) is also similar. Details are not described herein again.

The number of successful delivered PDCP SN range (the quantity of ranges of successfully delivered SNs) indicates the quantity of SN ranges after the highest SN successfully delivered in sequence in the scenario 1. The start of successfully delivered PDCP SN range (first successfully delivered PDCP SN in the SN range) indicates the first successfully delivered PDCP SN after the highest SN successfully delivered in sequence in the scenario 1, for example, may be the first successfully delivered PDCP SN in each SN range. The end of successfully delivered PDCP SN range (last successfully delivered PDCP SN in the SN range) indicates the last successfully delivered PDCP SN after the highest SN successfully delivered in sequence in the scenario 1, for example, may be the last successfully delivered PDCP SN in each SN range.

The number of successful retransmitted delivered PDCP SN range (the quantity of ranges of successfully retransmitted SNs) indicates the quantity of SN ranges after a highest SN successfully retransmitted in sequence in the scenario 2. The start of successfully retransmitted delivered PDCP SN range (first successfully retransmitted PDCP SN in the SN range) indicates the first successfully retransmitted PDCP SN after the highest SN successfully retransmitted in sequence in the scenario 2, for example, may be the first successfully retransmitted PDCP SN in each SN range. The end of successfully retransmitted delivered PDCP SN range (last successfully retransmitted PDCP SN in the SN range) indicates the last successfully retransmitted PDCP SN after the highest SN successfully retransmitted in sequence in the scenario 2, for example, may be the last successfully retransmitted PDCP SN in each SN range.

It should be understood that Table 13 is merely an example for description, and this embodiment of this application is not limited thereto.

Optionally, in this application, the first network node is a DU, and the second network node is a CU. Alternatively, the first network node is a base station, and the second network node is a base station.

In other words, the first network node may be replaced with a DU, and the second network node may be replaced with a CU. Alternatively, both the first network node and the second network node are replaced with a base station.

Optionally, in this application, in any one of the foregoing scenarios, the first network node may further send third indication information to the second network node, where the third indication information is used to indicate whether the successfully delivered SN is included after the highest SN successfully delivered in sequence. The third indication information may be used in the scenario 1 or the scenario 2, or the third indication information may be used in a case in which the scenario 1 and the scenario 2 coexist.

In an implementation, the third indication information indicates, by using an m1-bit field, whether a successfully delivered SN is included after the highest SN successfully delivered in sequence, where m1 is an integer greater than or equal to 1.

For example, m1=1. That is, a 1-bit field is used to indicate whether the successfully delivered SN is included after the highest SN successfully delivered in sequence. 0 corresponds to that a successfully delivered SN is included after the highest SN successfully delivered in sequence, and 1 corresponds to that a successfully delivered SN is not included after the highest SN successfully delivered in sequence. It may be understood that, when the 1-bit field is "0", it indicates that there is successfully delivered data following the highest SN successfully delivered in sequence. When the 1-bit field is "1", it indicates that there is no successfully delivered data following the highest SN successfully delivered in sequence, that is, delivery of all data fails. Alternatively, 1 corresponds to that a successfully delivered SN is included after the highest SN successfully delivered in sequence, and 0 corresponds to that a successfully delivered SN is not included after the highest SN successfully delivered in sequence. It should be understood that a specific indication manner is not limited in this embodiment of this application.

In another implementation, the third indication information indicates whether a bitmap indication exists after the highest SN successfully delivered in sequence. For example, an m2-bit field is used to indicate whether the bitmap indication exists after the highest SN successfully delivered in sequence, where m2 is an integer greater than or equal to 1.

When that the bitmap indication exists after the highest SN successfully delivered in sequence is indicated, it indicates that successfully delivered data exists after the highest SN successfully delivered in sequence, and a data delivery status is indicated by using a bitmap. When that no bitmap indication exists after the highest SN successfully delivered in sequence, a data delivery status is not indicated based on a bitmap. For a bitmap indication manner, refer to the foregoing descriptions, for example, any manner mentioned in the solution 4. Details are not described herein again.

For example, m2=1. That is, a 1-bit field is used to indicate whether a bitmap indication exists after the highest SN successfully delivered in sequence. 0 corresponds to that a bitmap indication exists after the highest SN successfully delivered in sequence, and 1 corresponds to that no bitmap indication exists after the highest SN successfully delivered in sequence. It may be understood that when the 1-bit field is "0", it indicates that there is successfully delivered data after the highest SN successfully delivered in sequence and that a data delivery status is indicated by using a bitmap. When the 1-bit field is "1", it indicates that no bitmap indication exists after the highest SN successfully delivered in sequence. Alternatively, 1 corresponds to that a bitmap indication exists after the highest SN successfully delivered in sequence, and 0 corresponds to that no bitmap indication exists after the highest SN successfully delivered in sequence. It should be understood that a specific indication manner is not limited in this embodiment of this application.

In another implementation, the third indication information indicates whether an SN range indication exists after the highest SN successfully delivered in sequence. For example, an m3-bit field is used to indicate whether the SN range indication exists after the highest SN successfully delivered in sequence, where m3 is an integer greater than or equal to 1.

When that an SN range indication exists after the highest SN successfully delivered in sequence is indicated, it indicates that there is successfully delivered data after the highest SN successfully delivered in sequence, and that a data delivery status is indicated based on an SN range (for example, information about an SN of data in each SN range and/or a quantity of SN ranges are/is indicated). When that no SN range indication exists after the highest SN successfully delivered in sequence, a data delivery status is not indicated based on an SN range. For the SN range, refer to the foregoing descriptions. Details are not described herein again.

For example, m3=1. That is, a 1-bit field is used to indicate whether an SN range indication exists after the highest SN successfully delivered in sequence. 0 corresponds to that an SN range indication exists after the highest SN successfully delivered in sequence, and 1 corresponds to that no SN range indication exists after the highest SN successfully delivered in sequence. It may be understood that when the 1-bit field is "0", it indicates that there is successfully delivered data after the highest SN successfully delivered in sequence and that a data delivery status is indicated based on an SN range. When the 1-bit field is "1", it indicates that no SN range indication exists after the highest SN successfully delivered in sequence. Alternatively, 1 corresponds to that an SN range indication exists after the highest SN successfully delivered in sequence, and 0 corresponds to that no SN range indication exists after the highest SN successfully delivered in sequence. It should be understood that a specific indication manner is not limited in this embodiment of this application.

In another implementation, the third indication information indicates whether the SN range indication or the bitmap indication is used after the highest SN successfully delivered in sequence. In other words, the third indication information may indicate a form of the second indication information. In other words, the third indication information may indicate whether the second indication information is indicated based on an SN range or based on a bitmap.

For example, an m4-bit field may be used to indicate whether the SN range indication or the bitmap indication is used after the highest SN successfully delivered in sequence, where m4 is an integer greater than or equal to 1.

For example, m4=1. That is, a 1-bit field is used to indicate whether the SN range indication or the bitmap indication is used after the highest SN successfully delivered in sequence. 0 corresponds to that the SN range indication is used after the highest SN successfully delivered in sequence, and 1 corresponds to that the bitmap indication is used after the highest SN successfully delivered in sequence.

Alternatively, 1 corresponds to that the SN range indication is used after the highest SN successfully delivered in sequence, and 0 corresponds to that the bitmap indication is used after the highest SN successfully delivered in sequence. It should be understood that a specific indication manner is not limited in this embodiment of this application.

For another example, m4=2. That is, a 2-bit field is used to indicate whether the SN range indication or the bitmap indication is used after the highest SN successfully delivered in sequence. 01 corresponds to that the SN range indication is used after the highest SN successfully delivered in sequence, and 10 corresponds to that the bitmap indication is used after the highest SN successfully delivered in sequence. Alternatively, 10 corresponds to that the SN range indication is used after the highest SN successfully delivered in sequence, and 01 corresponds to that the bitmap indication is used after the highest SN successfully delivered in sequence. It should be understood that a specific indication manner is not limited in this embodiment of this application. Optionally, 00 may correspond to that no SN range indication or bitmap indication exists after the highest SN successfully delivered in sequence. In other words, 00 corresponds to that there is no successfully delivered data after the highest SN successfully delivered in sequence. Optionally, 11 may correspond to that both an SN range indication and a bitmap indication are included after the highest SN successfully delivered in sequence. In other words, 11 corresponds to that successfully delivered data is included after the highest SN successfully delivered in sequence and that the data is indicated based on an SN range and based on a bitmap.

For example, indication may be implemented in a form shown in Table 14. It can be learned from Table 14 that the third indication information indicates whether the bitmap indication manner or the SN range indication manner is used after the highest SN successfully delivered in sequence.

L is an integer greater than or equal to 1. Optionally, whether L is one byte, three bytes, or another quantity of bytes may be further indicated.

The third indication information is used to indicate whether the successfully delivered SN is included after the highest SN successfully delivered in sequence, that is, may indicate whether the second indication information exists.

It should be understood that Table 14 is merely an example for description, and this embodiment of this application is not limited thereto. All variations related to Table 14 fall within the protection scope of this embodiment of this application.

For example, whether the SN range indication or the bitmap indication is used after the highest SN successfully delivered in sequence may alternatively be indicated through existence of the m2-bit field or the m3-bit field.

For example, the first network node may send interface control signaling to the second network node, to indicate whether an SN range indication or a bitmap indication is used after the highest SN successfully delivered in sequence.

For example, the first network node may send interface control signaling to the second network node, to indicate for each radio bearer, whether an SN range indication or a bitmap indication is used after the highest SN successfully delivered in sequence.

In other words, the third indication information may be carried in the interface control signaling sent by the first network node to the second network node, or the third indication information may be carried in the interface control signaling between the first network node and the second network node.

A CU-DU split scenario is used as an example. The third indication information may be carried in any message between a CU and a DU, for example, in any F1AP message. The F1AP message may be a non-UE-related F1AP message, or may be a UE-related F1AP message. A specific form of the F1AP message is not limited. For example, the third indication information may be carried in any one of the following messages: an F1 setup request (F1 SETUP REQUEST) message, a DU configuration update (for example, GNB-DU CONFIGURATION UPDATE) message, a CU configuration update acknowledgement (for example, GNB-CU CONFIGURATION UPDATE ACKNOWLEDGE) message, a UE context setup request (UE CONTEXT SETUP REQUEST) message, a UE context modification response (UE CONTEXT MODIFICATION RESPONSE) message, or another F1AP message.

A dual-link scenario is used as another example. The third indication information may be carried in any XnAP message between the first network node and the second network

TABLE 14

| bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind (for UM) | Highest Delivered NR PDCP SN Ind (for AM) | Final Frame Ind | Lost Packet Report | 1 |
| spare | Third indication information | | | Data rate Ind | Retransmitted NR PDCP SN Ind | Delivered Retransmitted NR PDCP SN Ind | Cause Report | 1 |
| Reserved part | | | | | | | | ... |
| Number of NR PDCP sequence number bits report | | | | | | | | 0 or L |
| Bitmap | | | | | | | | 0 or L |
| Number of successful delivered PDCP SN range | | | | | | | | 0 or L |
| Start of successfully delivered PDCP SN range | | | | | | | | 0 or 4 |
| End of successfully delivered PDCP SN range (or range size) | | | | | | | | 0 or 4 |
| Padding | | | | | | | | 0 to 3 | node. The XnAP message may be a non-UE-related XnAP message, or may be a UE-related XnAP message. A specific form of the XnAP message is not limited. For example, the third indication information may be carried in an SN node addition request (S-NODE ADDITION REQUEST) message or another XnAP message.

It should be understood that this implementation may also be used by the first network node to send, to the second network node, indication information used to indicate whether the first network node sends SN information (for example, the end of successfully delivered PDCP SN range in Table 11) of a packet or a quantity of packets in an SN range (for example, the range size in Table 12) to the second network node.

For example, the first network node may send interface control signaling to the second network node, to indicate a quantity of bytes occupied by the number of NR PDCP sequence number bits report in Table 14 for each radio bearer. That is, when the second indication information is indicated by using a bitmap, an interface message is used to indicate a quantity of bytes occupied by indication information of a bit quantity of the bitmap.

For example, the first network node may send interface control signaling to the second network node, to indicate a quantity of bytes occupied by the number of NR PDCP sequence number bits report in Table 14. That is, when the second indication information is indicated by using a bitmap, an interface message is used to indicate a quantity of bytes occupied by indication information of a bit quantity of the bitmap.

For example, the first network node may send interface control signaling to the second network node, to indicate a quantity of bytes occupied by the number of successful delivered PDCP SN range in Table 14 for each radio bearer, that is, to indicate a quantity of bytes occupied by the quantity of ranges of successfully delivered SNs after the highest SN successfully delivered in sequence.

For example, the first network node may send interface control signaling to the second network node, to indicate a quantity of bytes occupied by the number of successful delivered PDCP SN range in Table 14, that is, to indicate a quantity of bytes occupied by the quantity of ranges of successfully delivered SNs after the highest SN successfully delivered in sequence in the data.

As shown in Table 11 and Table 12, the first network node may send the end of successfully delivered PDCP SN range to the second network node, or may send the range size to the second network node. The first network node may send fourth indication information to the second network node, where the fourth indication information may be used to indicate that the first network node sends the SN information (for example, the end of successfully delivered PDCP SN range) of the packet to the second network node, or that the first network node sends the quantity of packets in the SN range (range size) to the second network node. After receiving the fourth indication information, the second network node may determine whether the information indicated by the second indication information includes the SN information of the packet or the quantity of packets in the SN range.

The fourth indication information may be implemented by using any example solution in this implementation.

For example, the fourth indication information may indicate, by using an m4-bit field, whether the end of successfully delivered PDCP SN range or the range size is sent.

For another example, the fourth indication information may be sent by the first network node to the second network node by using interface control signaling, to indicate whether the end of successfully delivered PDCP SN range or the range size is sent, as shown in Table 15.

For example, the second network node may send interface control signaling to the first network node, to indicate whether an SN range indication or a bitmap indication is used after the highest SN successfully delivered in sequence.

TABLE 15

| Number of successful delivered PDCP SN range | 0 or L |
|---|---|
| Start of successfully delivered PDCP SN range | 0 or 4 |
| End of successfully delivered PDCP SN range (or range size) | 0 or 4 |

For example, the second network node may send interface control signaling to the first network node, to indicate for each radio bearer, whether an SN range indication or a bitmap indication is used after the highest SN successfully delivered in sequence.

In other words, the third indication information may be carried in the interface control signaling sent by the second network node to the first network node, or the third indication information may be carried in the interface control signaling between the second network node and the first network node.

It should be understood that the foregoing plurality of implementations are merely examples for description, and this embodiment of this application is not limited thereto. Any manner that may indicate whether a successfully delivered SN is included after the highest SN successfully delivered in sequence falls within the protection scope of this embodiment of this application.

Based on the foregoing descriptions, in the solutions provided in this application, the first network node reports, to the second network node, the information about the SN that is delivered after the highest SN successfully delivered in sequence, to effectively indicate the data delivery status. Based on the data delivery status, the second network node can more accurately determine the data that needs to be retransmitted. In this way, the flow control mechanism can be optimized, delivery of redundant invalid data can be reduced, and resource utilization can be improved.

The embodiments described in this specification may be independent solutions, or may be combined based on internal logic. These solutions all fall within the protection scope of this application.

It may be understood that, in the foregoing method embodiments, the methods and the operations implemented by the terminal device may be alternatively implemented by a component (for example, a chip or a circuit) that may be used in the terminal device, and the methods and the operations implemented by the network device may be alternatively implemented by a component (for example, a chip or a circuit) that may be used in the network device.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that, to implement the foregoing functions, each network element, such as a transmit end device or a receive end device, includes a corresponding hardware structure and/or software module for performing each function. A person skilled in the art may be aware that units, algorithms, and steps in the examples described with reference to the embodiments disclosed in this specification may be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a transmit end device or a receive end device may be divided into function modules based on the foregoing method examples. For example, the transmit end device or the receive end device may be divided into function modules corresponding to functions, or two or more functions may be integrated into one processing module. The integrated module may be implemented in a form of hardware, or may be implemented in a form of a software function module. It should be noted that, in the embodiments of this application, division into the modules is an example, and is merely a logical function division. Another division manner may be used in actual implementation. The following uses an example in which each function module is obtained through division based on each corresponding function for description.

Figure 10:
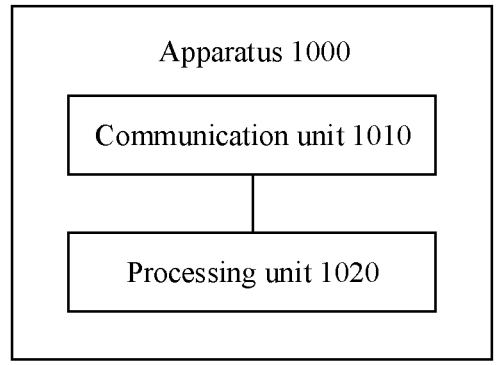
FIG. 10 is a block diagram of a communication apparatus according to an embodiment of this application.

FIG. 10 is a block diagram of a communication apparatus according to an embodiment of this application. As shown in FIG. 10, the communication apparatus 1000 may include a communication unit 1010 and a processing unit 1020.

In an embodiment, the communication apparatus 1000 may implement corresponding steps or procedures performed by the first network node in the foregoing method embodiments. For example, the communication apparatus may be a distributed unit or a gNB, or a chip or a circuit configured in the distributed unit or the gNB. The communication unit 1010 is configured to perform a sending/receiving-related operation on the first network node in the foregoing method embodiments, and the processing unit 1020 is configured to perform a processing-related operation on the first network node in the foregoing method embodiments.

In an embodiment, the communication unit 1010 is configured to send data to a terminal device. The communication unit 1010 is further configured to send first indication information and second indication information to a second network node. The first indication information is used to indicate information about a highest sequence number SN successfully delivered in sequence in the data, and the second indication information is used to indicate information about an SN that is delivered after the highest SN successfully delivered in sequence in the data.

Optionally, the processing unit 1020 is configured to generate the first indication information and the second indication information.

Optionally, the information about the SN that is delivered after the highest SN successfully delivered in sequence in the data includes one or more of the following: information about the first successfully delivered SN after the highest SN successfully delivered in sequence in the data; information about the last successfully delivered SN after the highest SN successfully delivered in sequence in the data; information about all successfully delivered SNs after the highest SN successfully delivered in sequence in the data; information about all unsuccessfully delivered SNs after the highest SN successfully delivered in sequence in the data; a quantity of successfully delivered SNs after the highest SN successfully delivered in sequence in the data; a quantity of unsuccessfully delivered SNs after the highest SN successfully delivered in sequence in the data; or a quantity of ranges of successfully delivered SNs after the highest SN successfully delivered in sequence in the data.

Optionally, the second indication information indicates, by using a bitmap, information about a successfully delivered and/or an unsuccessfully delivered SN after the highest SN successfully delivered in sequence in the data.

Optionally, the second indication information further includes indication information used to indicate a quantity of bits of the bitmap.

Optionally, the communication unit 1010 is further configured to send third indication information to the second network node, where the third indication information is used to indicate whether the successfully delivered SN is included after the highest SN successfully delivered in sequence in the data.

Optionally, the first network node is a distributed unit, and the second network node is a centralized unit; or the first network node is a base station, and the second network node is a base station.

The communication apparatus 1000 may implement steps or procedures performed by the first network node in the method 500 according to the embodiments of this application. The communication apparatus 1000 may include units configured to perform the method performed by the first network node in the method 500. In addition, the units in the communication apparatus 1000 and the foregoing other operations and/or functions are respectively used to implement corresponding procedures in the method 500.

It should be understood that, a process in which each unit performs the foregoing corresponding step has been described in detail in the foregoing method embodiments. For brevity, details are not described herein again.

It should be further understood that the communication unit 1010 in the communication apparatus 1000 may alternatively be an input/output interface.

In another embodiment, the communication apparatus 1000 may implement corresponding steps or procedures performed by the second network node in the foregoing method embodiments. For example, the communication apparatus may be a centralized unit or a gNB, or a chip or a circuit configured in the centralized unit or the gNB. The communication unit 1010 is configured to perform a sending/receiving-related operation on the second network node in the foregoing method embodiments, and the processing unit 1020 is configured to perform a processing-related operation on the second network node in the foregoing method embodiments.

In an embodiment, the communication unit 1010 is configured to send data to a first network node. The communication unit 1010 is further configured to receive first indication information and second indication information that are sent by the first network node. The first indication information is used to indicate information about a highest sequence number SN successfully delivered in sequence in the data, and the second indication information is used to indicate information about an SN that is delivered after the highest SN successfully delivered in sequence in the data.

Optionally, the processing unit 1020 is configured to determine information about a highest sequence number SN successfully delivered in sequence in the data and information about an SN that is delivered after the highest SN successfully delivered in sequence in the data Optionally, the information about the SN that is delivered after the highest SN successfully delivered in sequence in the data includes one or more of the following: information about the first successfully delivered SN after the highest SN successfully delivered in sequence in the data; information about the last successfully delivered SN after the highest SN successfully delivered in sequence in the data; information about all successfully delivered SNs after the highest SN successfully delivered in sequence in the data; information about all unsuccessfully delivered SNs after the highest SN successfully delivered in sequence in the data; a quantity of successfully delivered SNs after the highest SN successfully delivered in sequence in the data; a quantity of unsuccessfully delivered SNs after the highest SN successfully delivered in sequence in the data; or a quantity of ranges of successfully delivered SNs after the highest SN successfully delivered in sequence in the data.

Optionally, the second indication information indicates, by using a bitmap, information about a successfully delivered and/or an unsuccessfully delivered SN after the highest SN successfully delivered in sequence in the data.

Optionally, the second indication information further includes indication information used to indicate a quantity of bits of the bitmap.

Optionally, the communication unit 1010 is further configured to send third indication information to the second network node, where the third indication information is used to indicate whether the successfully delivered SN is included after the highest SN successfully delivered in sequence in the data.

Optionally, the first network node is a distributed unit, and the second network node is a centralized unit; or the first network node is a base station, and the second network node is a base station.

The communication apparatus 1000 may implement steps or procedures performed by the second network node in the method 500 according to the embodiments of this application. The communication apparatus 1000 may include units configured to perform the method performed by the second network node in the method 500. In addition, the units in the communication apparatus 1000 and the foregoing other operations and/or functions are respectively used to implement corresponding procedures in the method 500.

It should be understood that, a process in which each unit performs the foregoing corresponding step has been described in detail in the foregoing method embodiments. For brevity, details are not described herein again.

It should be further understood that the communication unit 1010 in the communication apparatus 1000 may alternatively be an input/output interface. The transceiver may include a transmitter and/or a receiver, to respectively implement functions of a sending unit and a receiving unit.

Figure 11:
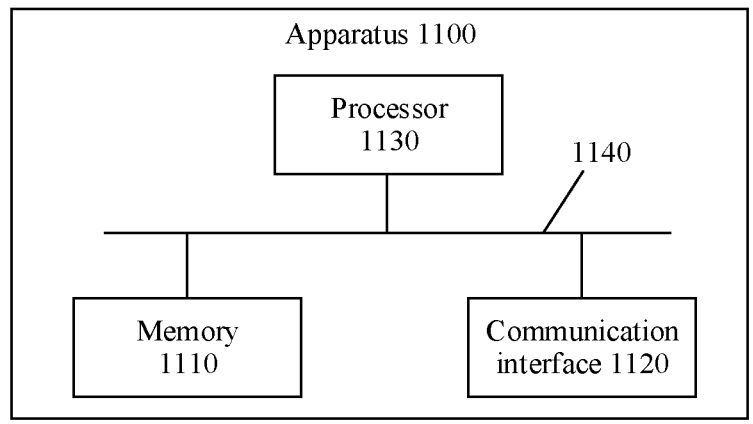
FIG. 11 is a diagram of a communication apparatus according to an embodiment of this application.

FIG. 11 is a diagram of an apparatus 1100 according to an embodiment of this application. The apparatus may include units that can implement steps performed by the first network node in the foregoing embodiments, for example, may perform the method performed by the first network node in the method 500. The apparatus 1100 includes a communication bus 1140, a memory 1110 coupled to the communication bus 1140 and configured to store a program, a communication interface 1120 coupled to the communication bus 1140 and configured to communicate with another device, and a processor 1130 coupled to the communication bus 1140 and configured to execute the program in the memory 1110. When the program is executed, the processor 1130 is configured to send data to a terminal device through the communication interface 1120, and send first indication information and second indication information to a second network node. The first indication information is used to indicate information about a highest sequence number SN successfully delivered in sequence in the data, and the second indication information is used to indicate information about an SN that is delivered after the highest SN successfully delivered in sequence in the data.

Figure 12:
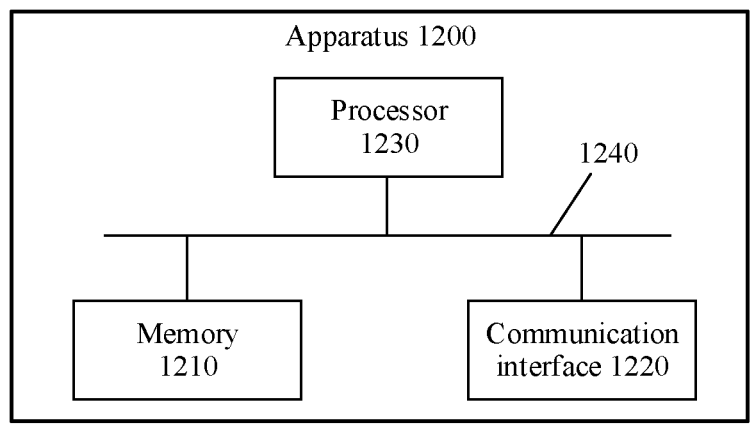
FIG. 12 is a diagram of a communication apparatus according to another embodiment of this application.

FIG. 12 is a diagram e of an apparatus 1200 according to an embodiment of this application. The apparatus may include units that can implement steps performed by the second network node in the foregoing embodiments, for example, may perform the method performed by the second network node in the method 500. The apparatus 1200 includes a communication bus 1240, a memory 1210 coupled to the communication bus 1240 and configured to store a program, a communication interface 1220 coupled to the communication bus 1240 and configured to communicate with another device, and a processor 1230 coupled to the communication bus 1240 and configured to execute the program in the memory 1210. When the program is executed, the processor 1230 is configured to send data to a first network node through the communication interface 1220, and receive first indication information and second indication information that are sent by the first network node. The first indication information is used to indicate information about a highest sequence number SN successfully delivered in sequence in the data, and the second indication information is used to indicate information about an SN that is delivered after the highest SN successfully delivered in sequence in the data.

Optionally, the communication interface (1120 or 1220) may be a receiver or a transmitter, or may be a transceiver.

In an implementation process, the steps in the foregoing methods may be implemented by using a hardware integrated logic circuit in the processor, or by using instructions in a form of software. Steps of the methods disclosed with reference to the embodiments of this application may be directly executed and completed by using a hardware processor, or may be executed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in the embodiments of this application may be an integrated circuit chip, and has a signal processing capability. In an implementation process, the steps in the foregoing method embodiments may be implemented by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, any conventional processor, or the like. The steps of the methods disclosed with reference to the embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and method described in this specification includes but is not limited to these memories and any memory of another proper type.

According to the method provided in the embodiments of this application, this application further provides a computer program product. The computer program product includes computer program code. When the computer program code is run on a computer, the computer is enabled to perform the method according to any one of the embodiments shown in the method 500.

According to the method provided in the embodiments of this application, this application further provides a computer-readable storage medium. The computer-readable storage medium stores program code. When the program code is run on a computer, the computer is enabled to perform the method according to any one of the embodiments shown in the method 500.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (SSD)), or the like.

Terms such as "component", "module", and "system" used in this specification are used to indicate computer-related entities, hardware, firmware, a combination of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more packets (for example, data from two components interacting with another component in a local system, in a distributed system, and/or across a network such as the Internet interacting with another system by using the signal).

A person of ordinary skill in the art may be aware that units, algorithms, and steps in the examples described with reference to the embodiments disclosed in this specification may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one location, or may be distributed on a plurality of network units. Some or all of the units may be selected based on an actual requirement to achieve the objectives of the solutions in the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    sending, by a first network node, data to a terminal device; and
    sending, by the first network node, first indication information and second indication information to a second network node;
    the first indication information indicating information about a highest sequence number (SN) successfully delivered in sequence in the data; and
    the second indication information indicating information about a SN delivered after the highest SN.

2. The communication method according to claim 1, wherein the information about the SN delivered after the highest SN comprises one or more of:
    information about a first successfully delivered SN after the highest SN;
    information about a last successfully delivered SN after the highest SN;
    information about all successfully delivered SNs after the highest SN;
    information about all unsuccessfully delivered SNs after the highest SN;
    a quantity of successfully delivered SNs after the highest SN;
    a quantity of unsuccessfully delivered SNs after the highest SN; or
    a quantity of ranges of successfully delivered SNs after the highest SN.

3. The communication method according to claim 1, wherein the second indication information indicates, using a bitmap, information about a successfully delivered and/or an unsuccessfully delivered SN after the highest SN.

4. The communication method according to claim 3, wherein the second indication information further indicating a quantity of bits of the bitmap.

5. The communication method according to claim 1, wherein the method further comprises:
    sending, by the first network node, third indication information to the second network node, the third indication information indicating successful delivery of the SN delivered after the highest SN.

6. The communication method according to claim 1, wherein:
    the first network node is a distributed unit and the second network node is a centralized unit; or
    the first network node is a base station and the second network node is a base station.

7. A communication method, comprising:
    sending, by a second network node, data to a first network node; and
    receiving, by the second network node, first indication information and second indication information sent by the first network node;
    the first indication information indicating information about a highest sequence number (SN) successfully delivered in sequence in the data; and
    the second indication information indicating information about a SN delivered after the highest SN.

8. The communication method according to claim 7, wherein the information about the SN delivered after the highest SN comprises one or more of:
    information about a first successfully delivered SN after the highest SN;
    information about a last successfully delivered SN after the highest SN;
    information about all successfully delivered SNs after the highest SN;
    information about all unsuccessfully delivered SNs after the highest SN;
    a quantity of successfully delivered SNs after the highest SN;
    a quantity of unsuccessfully delivered SNs after the highest SN a quantity of ranges of successfully delivered SNs after the highest SN.

9. The communication method according to claim 7, wherein the second indication information indicates, using a bitmap, information about a successfully delivered and/or an unsuccessfully delivered SN after the highest SN.

10. The communication method according to claim 7, wherein the method further comprises:
    receiving, by the second network node, third indication information sent by the first network node, the third indication information indicating whether a successfully delivered SN is comprised after the highest SN.

11. A communication apparatus, comprising:
    a transceiver configured to:
        send data to a terminal device; and
        send first indication information and second indication information to a second network node;
        the first indication information indicating information about a highest sequence number (SN) successfully delivered in sequence in the data; and
        the second indication information indicating information about a SN delivered after the highest SN.

12. The communication apparatus according to claim 11, the communication apparatus further comprising a processor in communication with the transceiver, the processor being configured to generate the first indication information and the second indication information.

13. The communication apparatus according to claim 11, wherein the information about the SN delivered after the highest SN comprises one or more of:
- information about a first successfully delivered SN after the highest SN;
- information about a last successfully delivered SN after the highest SN;
- information about all successfully delivered SNs after the highest SN;
- information about all unsuccessfully delivered SNs after the highest SN;
- a quantity of successfully delivered SNs after the highest SN;
- a quantity of unsuccessfully delivered SNs after the highest SN; or
- a quantity of ranges of successfully delivered SNs after the highest SN.

14. The communication apparatus according to claim 11, wherein the second indication information indicates, using a bitmap, information about a successfully delivered and/or an unsuccessfully delivered SN after the highest SN.

15. The communication apparatus according to claim 14, wherein the second indication information further indicating a quantity of bits of the bitmap.

16. The communication apparatus according to claim 11, wherein
- the communication apparatus is a distributed unit, and the second network node is a centralized unit; or
- the communication apparatus is a base station, and the second network node is a base station.

17. A communication apparatus, comprising:
a transceiver configured to:
- send data to a first network node; and
- receive first indication information and second indication information sent by the first network node;
- the first indication information indicate information about a highest sequence number (SN) successfully delivered in sequence in the data; and
- the second indication information indicating information about an SN delivered after the highest SN.

18. The communication apparatus according to claim 17, the communication apparatus further comprising a processor in communication with the transceiver, the processor being configured to:
- receive the second indication information from the transceiver; and
- determine the information about the SN that is delivered after the highest SN.

19. The communication apparatus according to claim 17, wherein the information about the SN delivered after the highest SN comprises one or more of:
- information about a first successfully delivered SN after the highest SN;
- information about a last successfully delivered SN after the highest SN;
- information about all successfully delivered SNs after the highest SN;
- information about all unsuccessfully delivered SNs after the highest SN;
- a quantity of successfully delivered SNs after the highest SN;
- a quantity of unsuccessfully delivered SNs after the highest SN; or
- a quantity of ranges of successfully delivered SNs after the highest SN.

20. The communication apparatus according to claim 17, wherein
- the first network node is a distributed unit, and the communication apparatus is a centralized unit; or
- the first network node is a base station, and the communication apparatus is a base station.

* * * * *